United States Patent
Mariyama et al.

(10) Patent No.: US 7,764,028 B2
(45) Date of Patent: Jul. 27, 2010

(54) LED DRIVE CIRCUIT AND LED LIGHT-EMITTING DEVICE

(75) Inventors: Mitsuru Mariyama, Katsuragi (JP); Seigo Okada, Nara (JP)

(73) Assignee: Sharp Kabushiki Kaisha, Osaka-Shi (JP)

(*) Notice: Subject to any disclaimer, the term of this patent is extended or adjusted under 35 U.S.C. 154(b) by 385 days.

(21) Appl. No.: 12/030,492

(22) Filed: Feb. 13, 2008

(65) Prior Publication Data

US 2008/0203936 A1 Aug. 28, 2008

(30) Foreign Application Priority Data

Feb. 28, 2007 (JP) ............... 2007-050425

(51) Int. Cl.
*H05B 37/02* (2006.01)
(52) U.S. Cl. ............... 315/360; 315/246; 315/294
(58) Field of Classification Search ............. 315/185 R, 315/185 S, 200 R, 200 A, 209 R, 246, 291, 315/294, 297, 312, 360; 345/82–84, 87, 345/94; 362/123, 277, 800, 806
See application file for complete search history.

(56) References Cited

U.S. PATENT DOCUMENTS

| | | | | |
|---|---|---|---|---|
| 5,852,348 A | * | 12/1998 | Lin | .................. 315/185 R |
| 6,664,735 B2 | | 12/2003 | Kita et al. | |
| 7,081,722 B1 | * | 7/2006 | Huynh et al. | ................ 315/323 |
| 7,294,978 B1 | * | 11/2007 | Shuy | ..................... 315/291 |
| 7,404,652 B2 | | 7/2008 | Ng et al. | |
| 7,679,292 B2 | * | 3/2010 | Allen et al. | ............. 315/200 R |
| 2006/0158130 A1 | | 7/2006 | Furukawa | |

FOREIGN PATENT DOCUMENTS

| | | |
|---|---|---|
| JP | 11-330561 A | 11/1999 |
| JP | 2002-015606 A | 1/2002 |
| JP | 2002-16290 A | 1/2002 |
| JP | 2002-231471 A | 8/2002 |
| JP | 2004-111104 A | 4/2004 |
| JP | 2004-327152 A | 11/2004 |
| JP | 2006-032030 A | 2/2006 |
| JP | 2006-032031 A | 2/2006 |
| JP | 2006-032032 A | 2/2006 |
| JP | 2006-032033 A | 2/2006 |
| JP | 2006-313808 A | 11/2006 |
| KR | 1999-44756 | 6/1999 |
| KR | 2006-71869 | 6/2006 |
| WO | WO-99/20085 | 4/1999 |

* cited by examiner

*Primary Examiner*—Douglas W Owens
*Assistant Examiner*—Tung X Le
(74) *Attorney, Agent, or Firm*—Birch, Stewart, Kolasch & Birch, LLP

(57) ABSTRACT

A driver circuit 3 feeds a pulse signal to an SSR 2 every half wave of alternating-current power from a commercial power source 4, and thereby separately controls the amounts of emitted light of LED groups 1x and 1y forming an LED unit 1, the LED groups 1x and 1y being connected in parallel in such a way as to point in different directions. That is, a first pulse signal for controlling the duration of light emission of the LED group 1x and a second pulse signal for controlling the duration of light emission of the LED group 1y are fed to the SSR 2 from the driver circuit 3.

17 Claims, 18 Drawing Sheets

US 7,764,028 B2

LED DRIVE CIRCUIT AND LED LIGHT-EMITTING DEVICE

This nonprovisional application claims priority under 35 U.S.C. §119(a) on Patent Application No. 2007-050425 filed in Japan on Feb. 28, 2007, the entire contents of which are hereby incorporated by reference.

BACKGROUND OF THE INVENTION

1. Field of the Invention

The present invention relates to LED drive circuits that drive an LED (light-emitting diode) unit, and to LED light-emitting devices provided with such LED drive circuits. More particularly, the present invention relates to an LED drive circuit that drives an LED unit with an alternating-current power, and to an LED light-emitting device provided with such an LED drive circuit.

2. Description of Related Art

In recent years, as increasingly high capacities and hence increasingly high densities have been sought in recording media for recording video and audio data, short-wavelength laser light has been sought after as laser light to be shone onto an optical disc that is a type of recording medium. On the other hand, there has been developed an LED that emits blue light (a blue LED). Along with the development of the blue LED, an LED that emits white light (a white LED) has also been developed, and has come to be increasingly used in a backlight of a liquid crystal display (LCD), an illuminating device, and the like. Now that the LEDs have been available in an increasing number of colors, they are used not only in illumination but also in an ever-widening range of applications such as neon signs and various industrial applications.

Offered as an LED drive circuit for supplying a drive current to an LED unit composed of a plurality of LEDs are an LED drive circuit operating on an AC (alternating-current) power and an LED drive circuit operating on a DC (direct-current) power. An example of an LED drive circuit in which the LED unit is driven by the AC current is seen in JP-A-H11-330561 (hereinafter "Patent Document 1") and JP-A-2002-015606 (hereinafter "Patent Document 2"). As shown in FIG. 21, in this LED drive circuit, two LED groups 100x and 100y are connected in parallel with an AC power source 101 in such a way as to point in different directions, and LEDs 1000a forming the LED group 100x are so connected as to point in one direction and LEDs 100b forming the LED group 100y are so connected as to point in the other direction, whereby the LED groups 100x and 100y are made, by turns, to emit light every half-cycle of the AC power.

An LED illuminator of Patent Document 1 is provided with a current-limiting transformer for limiting an alternating current supplied from the AC power source, whereby a current passed through the LEDs forming the LED group is limited with the impedance of the current-limiting transformer. An LED illuminating device of Patent Document 2 is provided with a plurality of load circuits, each being composed of the LED groups 100x and 100y connected in parallel in such a way as to point in different directions, as shown in FIG. 21, and each being connected in parallel with the AC power source. In addition, an inductor is connected in series to one of the load circuits, and a capacitor is connected in series to the other. Accordingly, currents having different phases are made to pass through the LED groups of each load circuit, whereby power factor is improved. Furthermore, by arranging the LED groups through which currents having different phases pass in such a way as to be adjacent to each other, optical distortion is reduced.

Alternatively, an LED drive circuit is configured as seen in JP-A-2002-231471 (hereinafter "Patent Document 3"), JP-A-2004-327152 (hereinafter "Patent Document 4"), and JP-A-2004-111104 (hereinafter "Patent Document 5"). As shown in FIG. 22, in this LED drive circuit, an AC power from an AC power source 150, which is a commercial power source, is converted into a DC power by an AC/DC converter 151, and a drive circuit 152 is supplied with the resultant DC power to drive an LED group 153. An LED lighting device of Patent Document 3 is provided with a step-up chopper circuit for stepping up a direct-current voltage from the DC power source. In this chopper circuit, based on the sum of a voltage signal commensurate with the magnitude of a current passed through the LED group and a voltage signal indicating the amount of dimming of the LED group, a duty ratio at which the switching element is operated is determined, and a direct-current voltage commensurate with the amount of dimming is applied to the LED group.

As is the case with the LED lighting device of Patent Document 3, an LED lighting device of Patent Document 4 is provided with a step-up chopper circuit for stepping up a direct-current voltage from the DC power source. Additionally, a PWM (pulse width modulation) circuit is provided that determines a duty ratio at which a switching element provided in the step-up chopper circuit is operated. An effective value of a phase-controlled alternating-current voltage from the AC power source is detected, and a duty ratio commensurate with the effective value thus detected is set, whereby dimming control of the LEDs is performed.

An LED lighting device of Patent Document 5 is provided with, as an LED group, an LED group of white LEDs and an LED group of colored LEDs, and a control circuit for performing dimming control of the white LED group and the colored LED group. The white LED group and the colored LED group are subjected to dimming control by the control circuit, whereby the brightness and emission color at the time of maximum light-emission and the brightness and emission color at the time of dimming control are continuously changed.

Furthermore, a phase-controlled dimmer provided with a phototriac coupler into which a phototriac and an LED are coupled together has been proposed (see JP-A-2006-032030 (hereinafter "Patent Document 6"), JP-A-2006-032031 (hereinafter "Patent Document 7"), JP-A-2006-032032 (hereinafter "Patent Document 8"), and JP-A-2006-032033 (hereinafter "Patent Document 9")). In LED lighting devices of Patent Documents 6 to 9, since an alternating-current voltage from the AC power source is subjected to full-wave rectification and is then supplied to the LED group, they are so configured as to prevent a malfunction that would occur near the minimum limit of dimming when phase control is performed in a similar manner every half-cycle of the alternating-current voltage.

As described above, different LED light-emitting devices provided with different LED drive circuits that drive an LED with the AC or DC power have been realized. However, the configurations of Patent Documents 1 and 2 simply aim to achieve a stable driving of LEDs and efficient power consumption, and lacks the circuit configuration for performing dimming control.

On the other hand, in the configurations of Patent Documents 3 and 4, dimming control is performed. However, these configurations not only make it necessary to make the step-up chopper circuit convert a direct-current voltage obtained as a result of AC-to-DC conversion to a value commensurate with the amount of current to be supplied to the LED group, but also make it indispensable to use an AC/DC converter when a commercial power source is used. As a result, with the configurations of Patent Documents 3 and 4, the circuit configuration increases not only in complexity but also in size.

With the configuration of Patent Document 5, although dimming control is performed on the white LED group and on the colored LED group, they are not individually subjected to different dimming control, but to the dimming control based on the same phase control. As a result, although it is possible to continuously change the brightness and emission color at the time of maximum light-emission and the brightness and emission color at the time of dimming control, it is impossible to obtain an optimum brightness and emission color by performing dimming control individually on the different LED groups.

Incidentally, also in the configuration of Patent Document 5, a direct-current voltage obtained as a result of AC-to-DC conversion is converted into a high-frequency voltage by an inverter circuit or the like, so as to make it possible to perform dimming control. As a result, like the configurations of Patent Documents 3 and 4, the circuit configuration of the drive circuit increases not only in complexity but also in size.

Since Patent Documents 6 to 9 are directed to the dimmers for use in illuminating devices having a white light as a load, the amount of current passed through the load is adjusted every half wave by performing phase adjustment every half wave in a similar manner, and an LED unit is so configured as to supply a direct-current electric power to LEDs by performing ill-wave rectification by using a diode bridge, the LEDs being arranged in series so as to point in the same forward direction. As a result, it is impossible to perform dimming control individually on a plurality of LED groups by performing different dimming control every half wave.

SUMMARY OF THE INVENTION

In view of the conventionally experienced problems described above, an object of the present invention is to provide LED drive circuits and LED light-emitting devices that are directly driven with an AC power source, and that can perform dimming control individually on a plurality of LED groups.

To achieve the above object, according to one aspect of the present invention, an LED drive circuit is provided with: a switch circuit having a secondary side connected in series between an LED unit and an alternating-current power source that supplies power to the LED unit to drive the LED unit, the switch circuit controlling an electrical connection between the alternating-current power source and the LED unit; and a driver circuit controlling the timing with which the secondary side of the switch circuit is brought into/out of conduction by feeding a control signal to a primary side of the switch circuit every half wave of alternating-current power from the alternating-current power source. Here, the LED unit is composed of a first LED group in which a plurality of first LEDs are connected in series in the same forward direction and a second LED group in which a plurality of second LEDs are connected in series in a forward direction that is opposite to the forward direction of the first LEDs, the first LED group and the second LED group being connected in parallel in such a way as to point in different directions. The driver circuit separately controls the durations of light emission of the first and second LED groups by controlling the timing with which the secondary side of the switch circuit is brought into/out of conduction.

According to another aspect of the present invention, an LED light-emitting device is provided with: an LED unit composed of a first LED group in which a plurality of first LEDs are connected in series in the same forward direction and a second LED group in which a plurality of second LEDs are connected in series in a forward direction that is opposite to the forward direction of the first LEDs, the first LED group and the second LED group being connected in parallel in such a way as to point in different directions; an alternating-current power source connected in series to the LED unit; and the LED drive circuit controlling the LED unit and the alternating-current power source to be electrically connected/disconnected.

According to the present invention, the timing with which the secondary side of the switch circuit is brought into/out of conduction is controlled every half wave of alternating-current power from the alternating-current power source. This makes it possible to separately control the amounts of emitted light of the first and second LED groups connected in parallel in such a way as to point in different directions. As a result, in a case where the first and second LED groups are made to emit light of different colors, it is possible to easily change color in a color range covering all the colors obtained by a color combination of light emitted from the first and second LED groups simply by separately controlling the timing with which the first and second LED groups emit light. In addition, as long as the alternating-current power source and the LED unit are connected in series, they can be so controlled as to be electrically connected/disconnected with ease simply by controlling the operation of the switch circuit. This helps simplify the circuit configuration. Furthermore, by performing feedback control based on a load current or color of emitted light, it is possible to make the LED unit emit light of a required color with a high degree of accuracy.

DETAILED DESCRIPTION OF PREFERRED EMBODIMENTS

Basic Configuration

Figure 1:
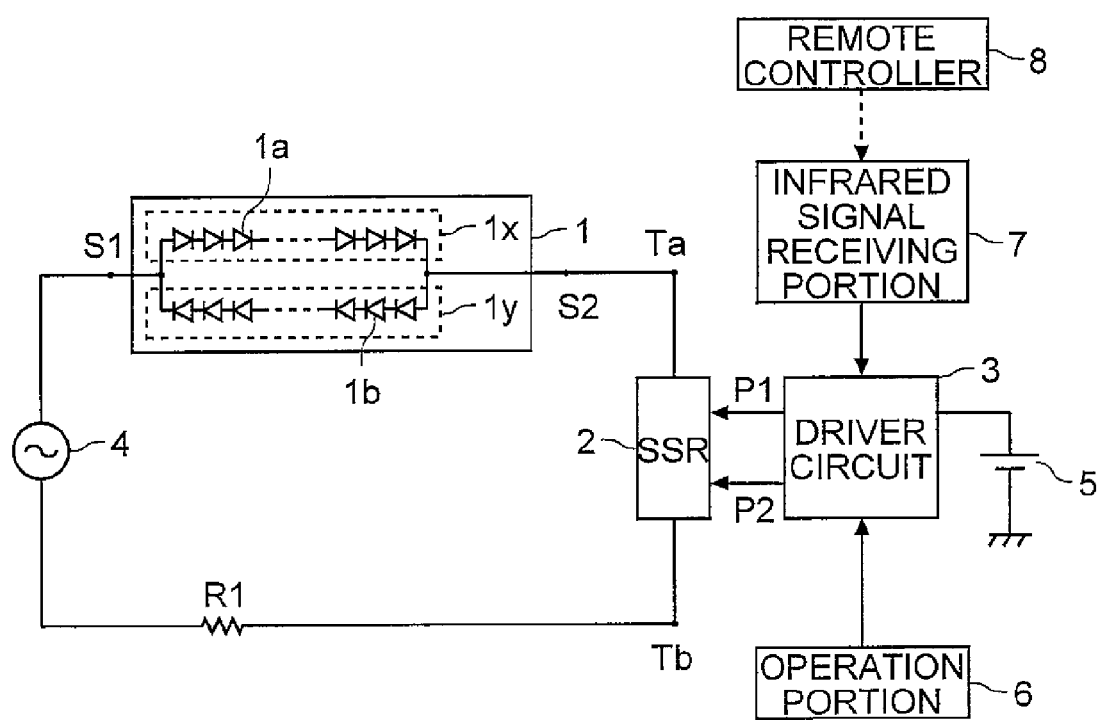
FIG. 1 is a block diagram showing a basic internal configuration of an LED light-emitting device of the invention.

With reference to the accompanying drawings, a basic configuration of an LED light-emitting device provided with an LED drive circuit of the invention will be described. FIG. 1 is a block diagram showing a basic internal configuration of the LED light-emitting device of the invention.

1. Configuration

The LED light-emitting device shown in FIG. 1 includes: an LED unit 1 composed of LED groups 1x and 1y connected in parallel in such a way as to point in different directions; a solid state relay (SSR) 2 connected, on the secondary side thereof, in series to the LED unit 1; a driver circuit 3 that feeds, to the primary side of the SSR 2, a pulse signal for controlling the secondary side of the SSR 2 to be brought into/out of conduction; a commercial power source 4, which is an AC power source, connected in series to the LED unit 1; a DC power source 5 applying a direct-current voltage to the driver circuit 3; and a resistor R1 connected to the secondary side of the SSR 2.

In the LED light-emitting device configured as described above, the LED unit 1 is composed of the LED group 1x in which a plurality of LEDs 1a are connected in series so as to point in the same forward direction, and the LED group 1y in which a plurality of LEDs 1b are connected in series so as to point in the same forward direction, the LED group 1x and the LED group 1y being connected in parallel. Here, the forward direction of the LEDs 1a forming the LED group 1x is opposite to that of the LEDs 1b forming the LED group 1y. As a result, the LED groups 1x and 1y are connected in parallel in such a way as to point in different directions.

To one node S1 at which the LED groups 1x and 1y of the LED unit 1 are connected together, one end of the commercial power source 4 is connected; to the other node S2 at which the LED groups 1x and 1y are connected together, one terminal Ta on the secondary side of the SSR 2 is connected. One end of the resistor R1 is connected to the other terminal Tb on the secondary side of the SSR 2, and the other end of the resistor R1 is connected to the other end of the commercial power source 4. As a result, the LED unit 1, the circuit on the secondary side of the SSR 2, and the resistor R1 are connected in series to the commercial power source 4.

A pulse signal outputted from the driver circuit 3 is inputted to the primary side of the SSR 2, so as to control the secondary side of the SSR 2 to be brought into/out of conduction. Outputted from the driver circuit 3 as the pulse signal are a first pulse signal for performing phase control during a positive half cycle of the alternating-current voltage from the commercial power source 4, and a second pulse signal for performing phase control during a negative half cycle of the alternating-current voltage from the commercial power source 4. That is, as a result of the first pulse signal having been inputted, a period (hereinafter a "first conduction period") during which the secondary side of the SSR 2 conducts in a positive half cycle of the alternating-current voltage from the commercial power source 4 is set; as a result of the second pulse signal having been inputted, a period (hereinafter a "second conduction period") during which the secondary side of the SSR 2 conducts in a negative half cycle of the alternating-current voltage from the commercial power source 4 is set.

There is further provided an operation portion 6 for inputting settings of the first and second conduction periods from outside. As a result of a signal from the operation portion 6 having been received by the driver circuit 3, the timing with which the first and second pulse signals are outputted from the driver circuit 3 is set. The configuration described above further includes an infrared signal receiving portion 7 that receives an infrared signal from a remote controller 8 used for inputting settings of the first and second conduction periods. The infrared signal receiving portion 7 gives an instruction to the driver circuit 3 based on the infrared signal received from the remote controller 8, and thereby sets the timing with which the first and second pulse signals are outputted from the driver circuit 3. That is, the signal fed to the driver circuit 3 from the operation portion 6 or the infrared signal receiving portion 7 serves as a dimming control signal for the LED unit 1.

2. Driving Operation

Figure 2A:
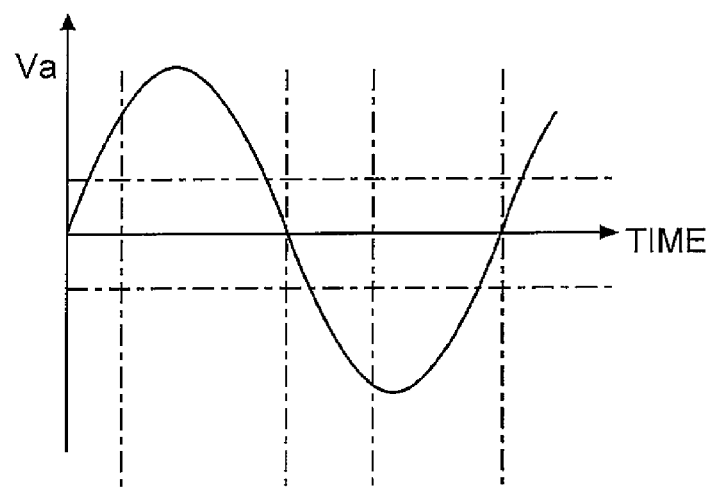
FIGS. 2A to 2D are timing charts showing a state change of different parts of the LED light-emitting device shown in FIG. 1.
Figure 2B:
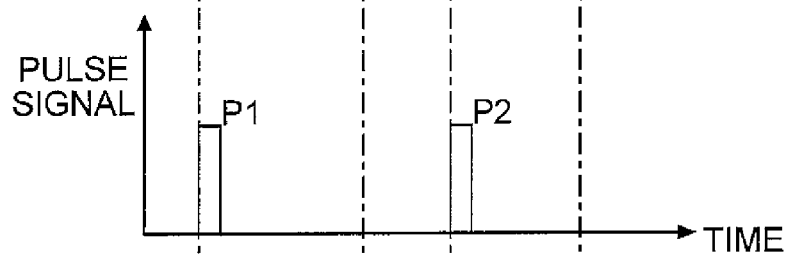
Figure 2C:
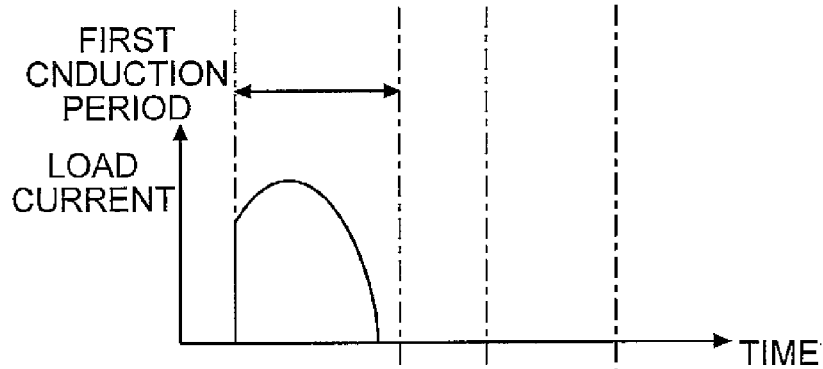
Figure 2D:
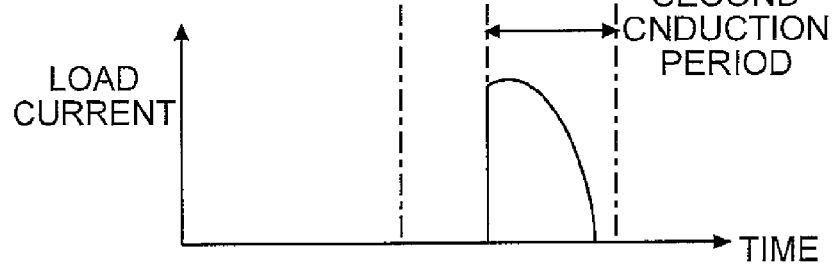

Hereinafter, how the LED light-emitting device shown in FIG. 1 operates will be described. Assume that, when an alternating-current voltage Va from the commercial power source 4 behaves as shown in FIG. 2A, a current passes through the LEDs 1a forming the LED group 1x of the LED unit 1 if the alternating-current voltage Va is positive, and a current passes through the LEDs 1b forming the LED group 1y of the LED unit 1 if the alternating-current voltage Va is negative. That is, as shown in FIG. 2B, if the first pulse signal P1 is fed while the alternating-current voltage Va is positive, the secondary side of the SSR 2 is brought into conduction, and is conducting during the first conduction period, namely a period from the moment at which the first pulse signal P1 turns high until the moment at which the alternating-current voltage Va becomes zero, as shown in FIG. 2C. As shown in FIG. 2B, if the second pulse signal P2 is fed while the alternating-current voltage Va is negative, the secondary side of the SSR 2 is brought into conduction, and is conducting during the second conduction period, namely a period from the moment at which the second pulse signal P2 turns high until the moment at which the alternating-current voltage Va becomes zero, as shown in FIG. 2D.

As described above, a period during which the LEDs 1a forming the LED group 1x emit light and a period during which the LEDs 1b forming the LED group 1y emit light are set according to the timing with which the first pulse signal P1 and the second pulse signal P2 are outputted. Here, let the sum of the operating voltages Vf of the LEDs 1a forming the LED group 1x be Vfsum1, the sum of the operating voltages Vf of the LEDs 1b forming the LED group 1y be Vfsum2, the resistance value of the resistor R1 be R, and the operating current of the LEDs 1a and 1b be If. That is, during the first conduction period, if the alternating-current voltage Va is higher than the voltage given by Vfsum1+R×If (=Vth1), a load current passes through the LED group 1x; during the second conduction period, if the alternating-current voltage Va is lower than the voltage given by −Vfsum2−R×If (=−Vth2), a load current passes through the LED group 1y.

Figure 3A:
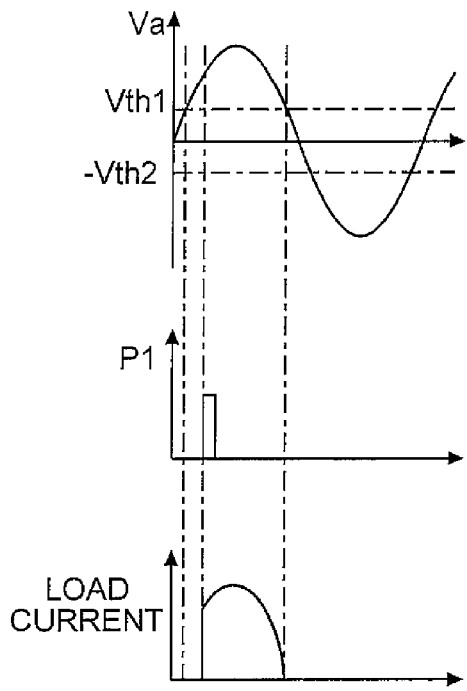
FIG. 3A is a timing chart showing one operating state in a dimming controlled state in the LED unit.
Figure 3B:
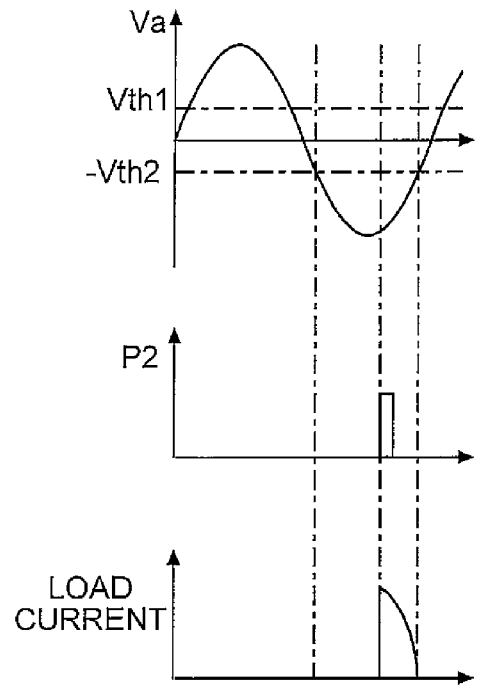
FIG. 3B is a timing chart showing another operating state in the dimming controlled state in the LED unit.

As a result, as shown in FIG. 3A, if the first pulse signal P1 is outputted to the SSR 2 from the driver circuit 3 while the alternating-current voltage Va is higher than the voltage Vth1, the load current passes through the LED group 1x during a period from the moment at which the first pulse signal P1 is fed until the moment at which the alternating-current voltage Va drops to the voltage Vth1. Likewise, as shown in FIG. 3B, if the second pulse signal P2 is fed to the SSR 2 from the driver circuit 3 while the alternating-current voltage Va is lower than the voltage −Vth2, the load current passes through the LED group 1y during a period from the moment at which the second pulse signal P2 is fed until the moment at which the alternating-current voltage Va rises to the voltage −Vth2. Hereinafter, an operating state in which a period during which the load current passes through the LED group 1x and a period during which the load current passes through the LED group 1y are respectively determined by the first and second pulse signals P1 and P2 is referred to as a "dimming controlled state".

Figure 3C:
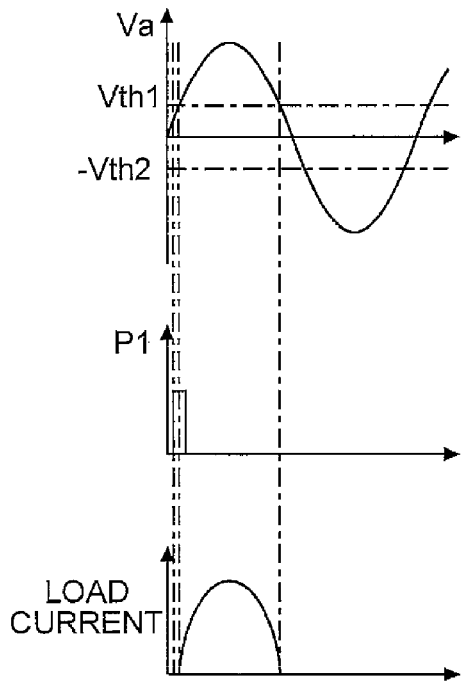
FIG. 3C is a timing chart showing one operating state in a maximum light-emission state in the LED unit.
Figure 3D:
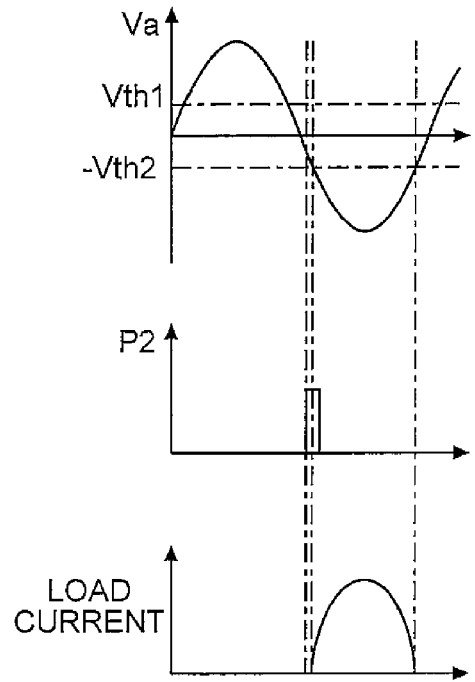
FIG. 3D is a timing chart showing another operating state in the maximum light-emission state in the LED unit.

On the other hand, as shown in FIG. 3C, if the first pulse signal P1 is outputted to the SSR 2 from the driver circuit 3 while the alternating-current voltage Va is lower than the voltage Vth1, the load current passes through the LED group 1x during a period from the moment at which the alternating-current voltage Va rises to the voltage Vth1 until the moment at which the alternating-current voltage Va drops to the voltage Vth1. Likewise, as shown in FIG. 3D, if the second pulse signal P2 is outputted to the SSR 2 from the driver circuit 3 while the alternating-current voltage Va is higher than the voltage −Vth2, the load current passes through the LED group 1y during a period from the moment at which the alternating-current voltage Va drops to the voltage −Vth2 until the moment at which the alternating-current voltage Va rises to the voltage −Vth2. Hereinafter, an operating state in which a period during which the load current passes through the LED group 1x and a period during which the load current passes through the LED group 1y are determined by the voltage value of the alternating-current voltage Va is referred to as a "maximum light-emission state".

3. Power Supply Efficiency in Maximum Light-Emission State

Hereinafter, a relationship between the power supply efficiency of the LED light-emitting device in the maximum light-emission state and the resistor R1 will be described. Ideally, LEDs having the same characteristics should be used as the LEDs 1a and 1b forming the LED unit 1, so as to equalize the operating voltages Vf to the greatest extent possible. In actuality, however, due to variations in characteristics, the operating voltages Vf of the LEDs vary. Due to such variations in the operating voltages Vf, the values of Vfsum1 and Vfsum2, which are the sum of the operating voltages of the LED group 1x and the sum of the operating voltages of the LED group 1y, respectively, vary in the LED light-emitting device.

Since the LED groups 1x and 1y are composed of a plurality of serially-connected LEDs 1a and 1b, respectively, the values of Vfsum1 and Vfsum2, which are the sum of the operating voltages of the LED group 1x and the sum of the operating voltages of the LED group 1y, respectively, can partly accommodate variations in the operating voltages Vf of the LEDs 1a and 1b. As a result, it is possible to reduce to some extent variations in the operating voltages of the LED unit 1 as a whole of the LED light-emitting device.

The values of Vfsum1 and Vfsum2, which are the sum of the operating voltages of the LED group 1x and the sum of the operating voltages of the LED group 1y, respectively, nevertheless vary in the LED light-emitting device. Such variations, however, can be absorbed by the resistor R1 connected in series to the LED unit 1. Furthermore, voltage variations in the commercial power source 4 can be absorbed by the resistor R1. As a result, it is possible to prevent a breakdown of the LEDs 1a and 1b. As described above, the use of the resistor R1 helps reduce the influence of variations in the operating voltages Vf of the LEDs 1a and 1b forming the LED unit 1 and voltage variations in the commercial power source 4 on the LED unit 1.

However, the resistor R1 consumes electric power, and the electric power consumption of the resistor R1 results in proportionately lower degree of efficiency. Thus, the number of the LEDs 1a and 1b forming the LED groups 1x and 1y respectively is determined in such a way as to minimize the electric power consumption of the resistor R1 and hence enhance the power supply efficiency of the LED unit 1. Here, let the operating voltages of the LED groups 1x and 1y be the same, and the value thereof be Vfsum (effective value). Then, the power supply efficiency relative to the voltage value Va (effective value) of the commercial power source 4 is given by Vfsum/Va. Therefore, the operating voltages of the LED groups 1x and 1y are set as high as possible. In addition, the number of LEDs 1a and 1b are so set that the difference between the value Vfsum1 (effective value), which is the sum of the operating voltages of the LED group 1x, and the value Vfsum2 (effective value), which is the sum of the operating voltages of the LED group 1y, falls within ±3% error.

In this way, a high degree of efficiency is achieved by making the operating voltages of the LED groups 1x and 1y as high as possible. At the same time, by appropriately setting the resistance value R of the resistor R1, it is possible to optimize a drive current of the LEDs 1a and 1b forming the LED unit 1. That is, since the LED unit 1 is driven by the commercial power source 4, which is an AC power source, as shown in FIGS. 3C and 3D, the LED groups 1x and 1y are each driven in one half-wave of an alternating current, and lit intermittently substantially with a duty ratio of the order of 25% in the maximum light-emission state. As a result, even if the voltage is made higher than that applied when the LED group 1x or the LED group 1y is driven with the DC power source, it is possible to make the LEDs 1a and 1b have the same lifetime as those driven with the DC power source.

The effective value of the drive current passed through the LED groups 1x and 1y here can be set up to the value at which the LED unit 1 consumes the power equivalent to that which it will consume if it is driven with a DC power source. And the effective value of the drive current passed through the LED groups 1x and 1y can be optimized by being set at an effective value equal to or less than the value at which the LED unit 1 consumes the power equivalent to that which it will consume if it is driven with a DC voltage, and thereby the brightness value of the LED unit 1 can be made equivalent to that which it offers when it is driven with a DC power source.

In order to drive the LED light-emitting device described above with a high degree of efficiency, the power supply efficiency of the LED unit 1 relative to the commercial power source 4 is set preferably to be higher than 60%, and more preferably at 85 to 98%. The reason that the power supply efficiency is set at equal to or lower than 98% is that power supply efficiency in the excess of 98% will make a limited current value vary greatly, resulting in unstable workings.

Figure 4:
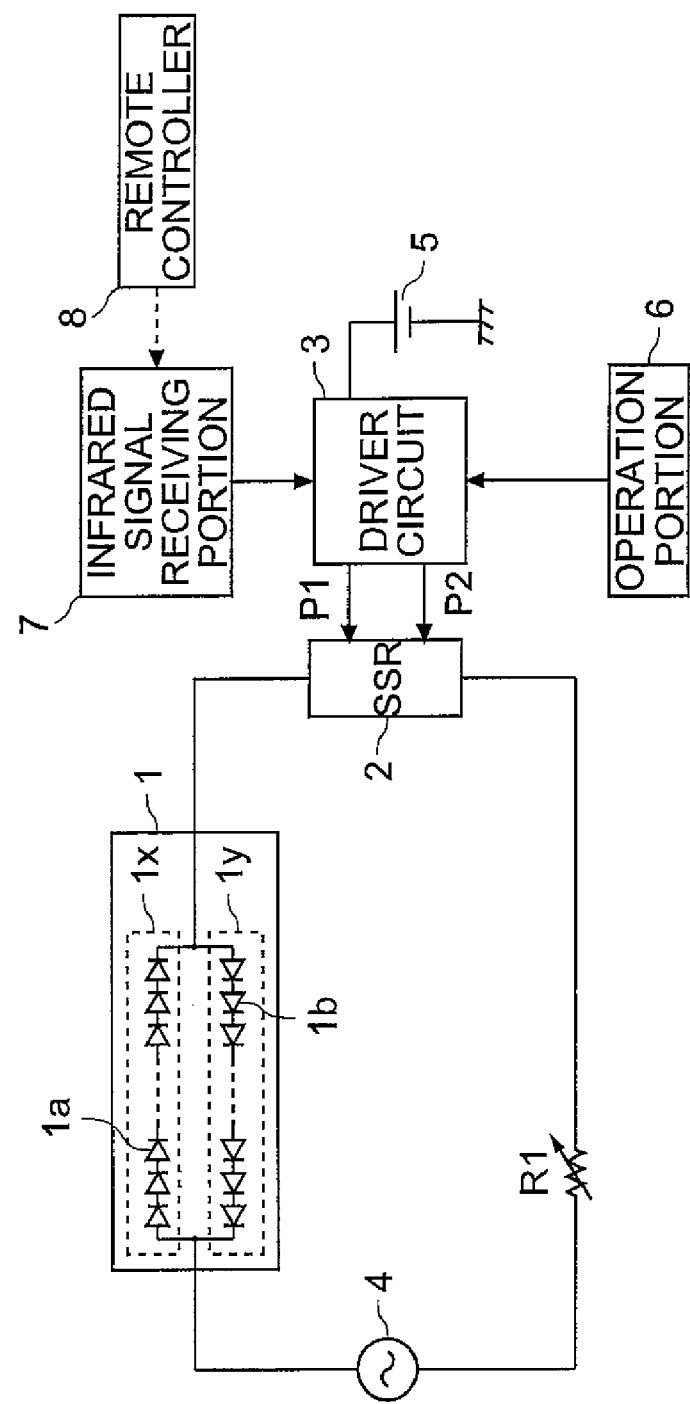
FIG. 4 is a block diagram showing a modified version of the LED light-emitting device shown in FIG. 1 in which the resistor is replaced with a variable resistor.

Incidentally, as shown in FIG. 4, the resistor R1 may be replaced with a variable resistor, such that the resistance value thereof can be changed according to the operating voltage of the LED unit 1 as a whole. Doing so makes it possible to deal with device-to-device variation of the operating voltage of the LED unit 1 as a whole. As shown in FIG. 4, replacing the resistor R1 with the variable resistor makes it easy to set the resistance value for each LED light-emitting device, the resistance value commensurate with the operating voltage of the installed LED unit 1 as a whole. This makes it possible to make constant a current limit value set for the LED unit 1 on a device-by-device basis, and enhance the power supply efficiency of the device.

As described above, since the LED unit 1 is so configured as to enhance the power supply efficiency, the LEDs 1a and 1b forming the LED groups 1x and 1y, respectively, can be increased in number. However, the number of serially-connected LEDs 1a and the number of serially-connected LEDs 1b depend on the voltage (effective value) of the commercial power source 4. Therefore, if there are provided only one LED group 1x and one LED group 1y, there is a limit to the number of LEDs 1a and the number of LEDs 1b.

Figure 5:
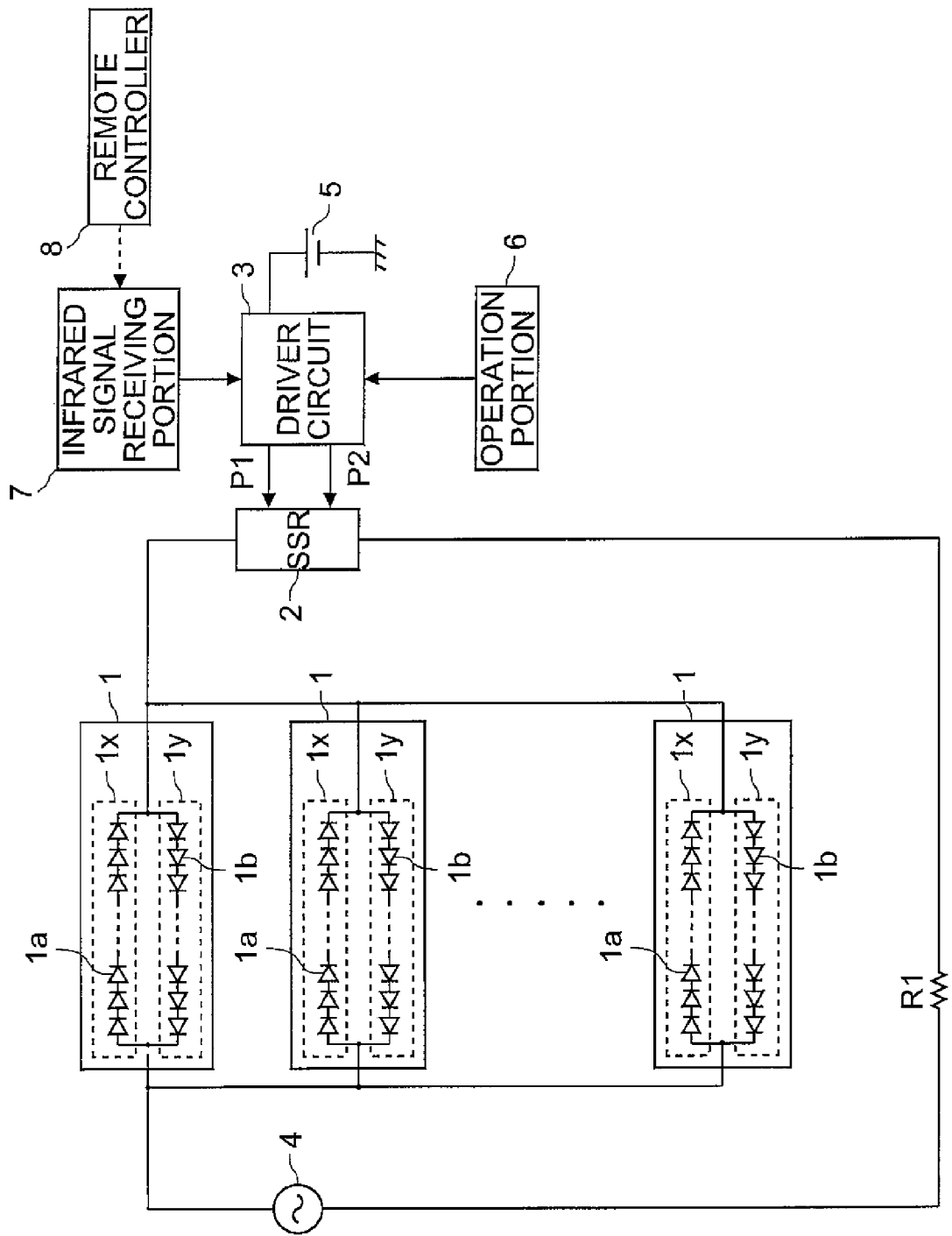
FIG. 5 is a block diagram showing a configuration of an LED light-emitting device in which a plurality of LED units are connected in parallel.

For this reason, in a case where the amount of emitted light needs to be increased, the number of LEDs 1a and the number of LEDs 1b are increased as follows. As shown in FIG. 5, there are provided a plurality of LED units 1 each being composed of a set of LED groups 1x and 1y, and the plurality of LEDs unit 1 are connected in parallel. Incidentally, the plurality of LED units 1 are disposed in such a way that the plurality of LED groups 1x and 1y form a pattern of alternate LED groups 1x and 1y. That is, the LED units 1 are disposed in such a way that one LED group 1x is disposed with two LED groups 1y on both sides thereof, and vice versa.

4. Color Combination of LEDS

Hereinafter, color combination of LEDs 1a and 1b forming the LED groups 1x and 1y, respectively, of the LED unit 1 will be described. Now, as an example of color combination of the LEDs 1a and 1b forming the LED unit 1, a description will be given of a case in which LEDs of a single color are used, a case in which LEDs of two colors are used, and a case in which LEDs of three colors are used. It should be noted that the following description deals with a case in which LEDs of a single color are used, a case in which LEDs of two colors are used, and a case in which LEDs of three colors are used: however, it is also possible to use LEDs of four or more colors in a manner similar to those described below. Though not described below, in a case where LEDs of two or more colors are used, it is possible to make the LED groups 1x and 1y emit light with different wavelengths by forming at least one of the group of LEDs 1a and the group of LEDs 1b by using LEDs of more than one color in combination. Furthermore, in a case where LEDs of three or more colors are used, only one of the group of LEDs 1a and the group of LEDs 1b may be formed by using LEDs of more than one color in combination, so as to make the LED groups 1x and 1y emit light with different wavelengths. In addition, in a case where LEDs of three or more colors are used, and both the group of LEDs 1a and the group of LEDs 1b are formed by using LEDs of more than one color in combination, it is possible to make the LED groups 1x and 1y emit light with different wavelengths by forming the group of LEDs 1a and the group of LEDs 1b by using LEDs of more than one color in different combinations.

LEDs of Single Color

In a case where LEDs of a single color are used as the LEDs 1a and 1b forming the LED unit 1, the LED groups 1x and 1y are each driven by half-wave rectified power. As a result, the LED unit 1 emits light in such a way as if it were driven by full-wave rectified power. The amount of emitted light can be adjusted by changing the timing with which the first and second pulse signals are outputted, and thereby changing the duration of light emission of the LEDs 1a and the duration of light emission of the LEDs 1b. As described above, in a case where LEDs of a single color are used as the LEDs 1a and 1b forming the LED unit 1, using white LEDs as the LEDs 1a and 1b produces white light that can be used as a substitute for fluorescent light. The number of LEDs 1a and the number of LEDs 1b here may be the same. Alternatively, the number of LEDs 1a and the number of LEDs 1b may be set in such a way that the values of Vfsum1 and Vfsum2, which are the sum of the operating voltages of the LED group 1x and the sum of the operating voltages of the LED group 1y, respectively, become equal to each other.

At the time of adjustment of the amount of emitted light (brightness) of the LED unit 1, the amounts of emitted light (brightness) of the LED groups 1x and 1y may be made equal to each other by making equal the time from when the alternating-current voltage from the commercial power source 4 changes from zero to a positive value until when the first pulse signal is outputted and the time from when the alternating-current voltage from the commercial power source 4 changes from zero to a negative value until when the second pulse signal is outputted. That is, by making the duty ratios of the LED groups 1x and 1y equal to each other and changing them appropriately, it is possible to achieve the amount of emitted light (brightness) of the LED unit 1 according to the dimming control signal fed to the driver circuit 3.

Alternatively, the amount of emitted light (brightness) of the LED unit 1 as a whole may be fine adjusted by individually controlling the timing with which the first pulse signal is outputted and the timing with which the second pulse signal is outputted. For example, after bringing the LED group 1x into the maximum light-emission state with the first pulse signal, by changing the timing with which the second pulse signal is outputted, the LED group 1y is brought into the dimming controlled state for adjusting the amount of emitted light (brightness) thereof. Doing so makes it possible to fine adjust the amount of emitted light (brightness) of the LED unit 1 according to the dimming control signal fed to the driver circuit 3.

Figure 6A:
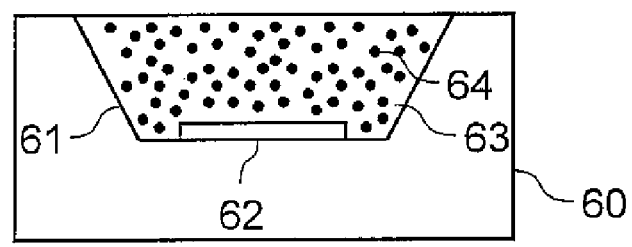
FIG. 6A is a cross-sectional view showing an outline of a structure of an LED.
Figure 6B:
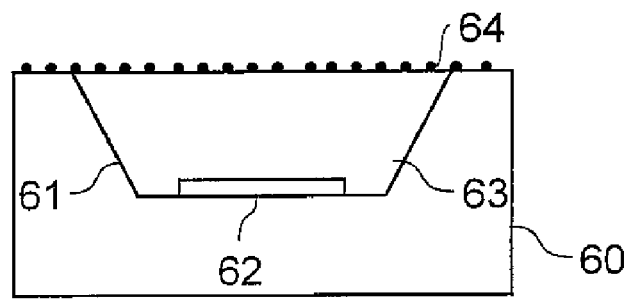
FIG. 6B is a cross-sectional view showing an outline of another structure of an LED.

In a case where white LEDs, which are often used for the purpose of illumination, are used as the LEDs 1a and 1b, such white LEDs are usually produced as blue LEDs covered with a fluorescent substance. That is, as shown in FIGS. 6A and 6B, a blue LED 62 is first placed in the bottom of a depression 61 of a package 60 in such a way that the light-emitting surface thereof faces toward the opening of the depression 61. Then, the depression 61 in which the blue LED 62 is placed is filled with a fluorescent substance 63.

In this structure, an effect of phosphorescence may be achieved by adding a phosphorescent material 64 to the fluorescent substance 63 as shown in FIG. 6A; instead, it may be achieved by applying the phosphorescent material 64 to the surface of the package 60 containing the fluorescent substance 63 as shown in FIG. 6B. With this structure, radiation is absorbed by the phosphorescent material and is then re-emitted. This makes it possible to reduce the flicker caused by a ripple due to a supply of the alternating current from the commercial power source 4, and hence achieve a white LED producing light in an amount sufficient for the purpose of illumination. Used as the phosphorescent material 64 are, for example, a ZnS (zinc sulfide)-based material such as ZnS+CdS/Cu or ZnS/Cu, and a CaS (calcium sulfide)-based material such as CaS/Bi.

LEDs of Two Colors

The following is a case in which LEDs of two colors are used as the LEDs 1a and 1b forming the LED unit 1. In this case, the LED group 1x is composed of the LEDs 1a of a single color, and the LED group 1y is composed of the LEDs 1b of a single color that is different from the color of the LEDs 1a. With this configuration, by controlling the amounts of emitted light (brightness) of the LED groups 1x and 1y independently by the first and second pulse signals outputted from the driver circuit 3, the color tone of the LED unit 1 can be adjusted as follows. Since the adjacent LED groups 1x and 1y alternately emit light every half cycle (half wave) of the AC power from the commercial power source 4, a mixture of colors of light emitted from the LED groups 1x and 1y is perceived by the human eyes.

Here, suppose that an LED emitting light with a wavelength L1 is used as the LED 1a and an LED emitting light with a wavelength L2 (L1≠L2) is used as the LED 1b. Then, by individually adjusting the timing with which the first pulse signal is outputted and the timing with which the second pulse signal is outputted, the color of light emitted from the LED unit 1 is adjusted to a color having a wavelength determined by the brightness value of the color of light with a wavelength L1 and the brightness value of the color of light with a wavelength L2. The wavelength of light emitted from the LED unit 1 here is determined based on the ratio of the ON period (light emission period) T1 of the LED group 1x controlled by the first pulse signal to the ON period (light emission period) T2 of the LED group 1y controlled by the second pulse signal. By adjusting the lengths of the ON periods T1 and T2 of the LED groups 1x and 1y by the first and second pulse signals without changing the ratio between the ON periods T1 and T2 of the LED groups 1x and 1y, it is possible to adjust the amount of emitted light (brightness) of the LED unit 1 without changing the wavelength of the light emitted therefrom.

In a case where LEDs of two colors are used in combination, the number of LEDs 1a forming the LED group 1x and the number of LEDs 1b forming the LED group 1y may be set in such a way that the values of Vfsum1 and Vfsum2, which are the sum of the operating voltages of the LED group 1x and the sum of the operating voltages of the LED group 1y, respectively, become equal to each other.

Alternatively, the number of LEDs 1a and the number of LEDs 1b may be set in such a way that a color with a desired wavelength can be obtained when both the LED groups 1x and 1y are brought into the maximum light-emission state. In this case, based on the number of one of the LEDs 1a and 1b, the number of the other is determined. Suppose that the number of LEDs 1a and 1b are set based on the number of LEDs 1a. Then, the resistance value of the resistor R1 and the number of LEDs 1a are first set based on the operating voltage of the LED group 1x in such a way as to achieve a high degree of power supply efficiency; then, the number of LEDs 1b is set in such a way that a color with a particular wavelength can be obtained when both the LED groups 1x and 1y are brought into the maximum light-emission state. Incidentally, in a case where the number of LEDs 1a and the number of LEDs 1b are set in such a way that a desired color can be obtained in the maximum light-emission state as described above, a resistor is connected in series to the LEDs forming the LED group having a lower operating voltage, such that the same voltage is applied to the LED groups 1x and 1y.

In a case where the number of LEDs 1a forming the LED group 1x is different from that of LEDs 1b forming the LED group 1y, it is preferable that the LEDs 1a and 1b be each arranged at regular intervals, and the LEDs of the group that is smaller in number be arranged among the LEDs of the group that is larger in number. As a result of the LEDs 1a and 1b being arranged in this way, when both the LED groups 1x and 1y are in the maximum light-emission state, the LED unit 1 as a whole can achieve an even tone of color obtained as a mixture of colors of light emitted from the LEDs 1a and 1b.

Some examples of a combination of two colors are: (1) a combination in which the LED 1a is a green LED (wavelength: 520 nm) and the LED 1b is a blue LED (wavelength: 420 nm), (2) a combination in which the LED 1a is a green LED (wavelength: 520 nm) and the LED 1b is a red LED (wavelength: 680 nm), and (3) a combination in which the LED 1a is a red LED (wavelength: 680 nm) and the LED 1b is a blue LED (wavelength: 420 nm). Hereinafter, the examples described above will be explained briefly.

(1) Combination of Green LED and Blue LED

A description will be given below of a case in which the LED 1a is a green LED and the LED 1b is a blue LED. If the first pulse signal alone is fed to the SSR 2 from the driver circuit 3, the LED group 1x alone is driven by half-wave rectified power. As a result, the LED group 1x alone emits light, whereby green light is emitted from the LED unit 1. The brightness of the green light is set according to the timing with which the first pulse signal is outputted. If the second pulse signal alone is fed to the SSR 2 from the driver circuit 3, the LED group 1y alone is driven by half-wave rectified power. As a result, the LED group 1y alone emits light, whereby blue light is emitted from the LED unit 1. The brightness of the blue light is set according to the timing with which the second pulse signal is outputted.

If the first and second pulse signals are fed to the SSR 2 from the driver circuit 3, the LED groups 1x and 1y are each driven by half-wave rectified power. As a result, according to the timing with which the first pulse signal is outputted and the timing with which the second pulse signal is outputted, the green light and the blue light are mixed to produce pale blue light, and the resultant pale blue light is emitted from the LED unit 1. In this case, if the ON period T1 of the LED group 1x is longer than the ON period T2 of the LED group 1y, pale blue light with a tinge of green (wavelength: 520 nm) is emitted from the LED unit 1; if the ON period T1 of the LED group 1x is shorter than the ON period T2 of the LED group 1y, pale blue light with a tinge of blue (wavelength: 420 nm) is emitted from the LED unit 1. As described above, according to the timing with which the first pulse signal is outputted and the timing with which the second pulse signal is outputted, the brightness as well as the color tone of the pale blue light emitted from the LED unit 1 is set.

By controlling the amounts of emitted light (brightness) of the LED groups 1x and 1y individually by changing the timing with which the first pulse signal is outputted and the timing with which the second pulse signal is outputted, it is possible to change color in a color range covering blue, green, and pale blue. As a result, applications are possible, for example, in illumination which allows the color of light emitted from the LED unit 1 to be changed over time by changing along the time axis the timing with which the first pulse signal is outputted and the timing with which the second pulse signal is outputted.

(2) Combination of Green LED and Red LED

A description will be given below of a case in which the LED 1a is a green LED and the LED 1b is a red LED. If the first pulse signal alone is fed to the SSR 2 from the driver circuit 3, as is the case of the combination explained in (1) above, green light is emitted from the LED unit 1. If the second pulse signal alone is fed to the SSR 2 from the driver circuit 3, the LED group 1y alone is driven by half-wave rectified power. As a result, the LED group 1y alone emits light, whereby red light is emitted from the LED unit 1. The brightness of the red light is set according to the timing with which the second pulse signal is outputted.

If the first and second pulse signals are fed to the SSR 2 from the driver circuit 3, the LED groups 1x and 1y are each driven by half-wave rectified power. As a result, according to the timing with which the first pulse signal is outputted and the timing with which the second pulse signal is outputted, the green light and the red light are mixed to produce yellow light, and the resultant yellow light is emitted from the LED unit 1. In this case, if the ON period T1 of the LED group 1x is longer than the ON period T2 of the LED group 1y, yellow light with a tinge of green (wavelength: 520 nm) is emitted from the LED unit 1; if the ON period T1 of the LED group 1x is shorter than the ON period T2 of the LED group 1y, yellow light with a tinge of red (wavelength: 680 nm) is emitted from the LED unit 1. As described above, according to the timing with which the first pulse signal is outputted and the timing with which the second pulse signal is outputted, the brightness as well as the color tone of the yellow light emitted from the LED unit 1 is set.

By controlling the amounts of emitted light (brightness) of the LED groups 1x and 1y individually by changing the timing with which the first pulse signal is outputted and the timing with which the second pulse signal is outputted, it is possible to change color in a color range covering green, red, and yellow. As a result, applications are possible, for example, in illumination which allows the color of light emitted from the LED unit 1 to be changed over time by changing along the time axis the timing with which the first pulse signal is outputted and the timing with which the second pulse signal is outputted. Furthermore, since green, red, and yellow light can be emitted, applications are also possible in traffic lights.

(3) Combination of Red LED and Blue LED

A description will be given below of a case in which the LED 1a is a red LED and the LED 1b is a blue LED. If the first pulse signal alone is fed to the SSR 2 from the driver circuit 3, just as the combination explained in (2) above when the second pulse signal alone is fed, red light is emitted from the LED unit 1. If the second pulse signal alone is fed to the SSR 2 from the driver circuit 3, as is the case with the combination explained in (1) above, blue light is emitted from the LED unit 1.

If the first and second pulse signals are fed to the SSR 2 from the driver circuit 3, the LED groups 1x and 1y are each driven by half-wave rectified power. As a result, according to the timing with which the first pulse signal is outputted and the timing with which the second pulse signal is outputted, the red light and the blue light are mixed to produce purple light, and the resultant purple light is emitted from the LED unit 1. In this case, if the ON period T1 of the LED group 1x is longer than the ON period T2 of the LED group 1y, purple light with a tinge of red (wavelength: 680 nm) is emitted from the LED unit 1; if the ON period T1 of the LED group 1x is shorter than the ON period T2 of the LED group 1y, purple light with a tinge of blue (wavelength: 420 nm) is emitted from the LED unit 1. As described above, according to the timing with which the first pulse signal is outputted and the timing with which the second pulse signal is outputted, the brightness as well as the color tone of the purple light emitted from the LED unit 1 is set.

By controlling the amounts of emitted light (brightness) of the LED groups 1x and 1y individually by changing the timing with which the first pulse signal is outputted and the timing with which the second pulse signal is outputted, it is possible to change color in a color range covering red, blue, and purple. As a result, applications are possible, for example, in illumination which allows the color of light emitted from the LED unit 1 to be changed over time by changing along the time axis the timing with which the first pulse signal is outputted and the timing with which the second pulse signal is outputted.

It is known that the blue LED light promotes germination and the red LED light promotes germination, photosynthesis, and flowering, thereby contributing to the improvement of efficiency of the vegetable cultivation. Therefore, applications are possible in improvement of efficiency of the vegetable cultivation by producing, for example, the flashing of red and blue LED light by feeding the first and second pulse signals alternately with predetermined timing. Furthermore, by emitting ultraviolet light from the LED unit 1, it is possible to increase polyphenols and to produce a bactericidal effect; by emitting blue light from the LED unit 1, it is possible to maintain the freshness of vegetables, for example.

LEDs of Three Colors

The following is a case in which LEDs of three colors are used as the LEDs 1a and 1b forming the LED unit 1. In this case, LEDs of two colors are used in combination as the LEDs 1a forming the LED group 1x, and LEDs of a single color that is different from the colors of the LEDs 1a are used as the LEDs 1b forming the LED group 1y. With this configuration, as is the case where LEDs of two colors are used in combination, by controlling the amounts of emitted light (brightness) of the LED groups 1x and 1y independently by the first and second pulse signals outputted from the driver circuit 3, the color tone of the LED unit 1 can be adjusted as follows.

Since the adjacent LED groups 1x and 1y alternately emit light every half cycle (half wave) of the AC power from the commercial power source 4, a mixture of colors of light emitted from the LED groups 1x and 1y is perceived by the human eyes.

Here, LEDs of two colors, of which one is an LED emitting light with a wavelength L1 and the other is an LED emitting light with a wavelength L2 (L1≠L2), are used as the LEDs 1a and connected in series to form the LED group 1x, and LEDs emitting light with a wavelength L3 (L3≠L1, L3≠L2) are used as the LEDs 1b and connected in series to form the LED group y. In this case, if the LEDs emitting light with a wavelength L1 and the LEDs emitting light with a wavelength L2, which are used as the LEDs 1a, are equal in number, they are so disposed as to form an alternate arrangement of the LEDs emitting light with a wavelength L1 and the LEDs emitting light with a wavelength L2. On the other hand, if the LEDs emitting light with a wavelength L1 and the LEDs emitting light with a wavelength L2, which are used as the LEDs 1a, are not equal in number, they are, for example, divided into groups of LEDs, each being composed of a minimum number of LEDs emitting light with a wavelength L1 and a minimum number of LEDs emitting light with a wavelength L2 with the ratio therebetween maintained, and the groups thus obtained are arranged in such a way that the same pattern is repeated. That is, let the ratio between the LEDs emitting light with a wavelength L1 and the LEDs emitting light with a wavelength L2 be x: y. Then, they are divided into groups of LEDs, each being composed of x LEDs emitting light with a wavelength L1 and y LEDs emitting light with a wavelength L2, and the groups thus obtained are arranged in such a way that the same pattern of x+y LEDs is repeated. As a result of the LEDs 1a being arranged in this way, the color of light emitted from the LED group 1x is a mixture of a color of light with a wavelength L1 and a color of light with a wavelength L2.

As a result, as is the case where LEDs of two colors are used in combination, the wavelength of light emitted from the LED unit 1 is determined based on the ratio of the ON period (light emission period) T1 of the LED group 1x controlled by the first pulse signal to the ON period (light emission period) T2 of the LED group 1y controlled by the second pulse signal. By adjusting the lengths of the ON periods T1 and T2 of the LED groups 1x and 1y by the first and second pulse signals, respectively, without changing the ratio between the ON periods T1 and T2 of the LED groups 1x and 1y, it is possible to adjust the amount of emitted light (brightness) of the LED unit 1 without changing the wavelength of the light emitted therefrom.

As is the case where LEDs of two colors are used in combination, in a case where the number of LEDs 1a forming the LED group 1x is different from that of LEDs 1b forming the LED group 1y, it is preferable that the LEDs 1a and 1b be each arranged at regular intervals, and the LEDs of the group that is smaller in number be arranged among the LEDs of the group that is larger in number. As a result of the LEDs 1a and 1b being arranged in this way, when both the LED groups 1x and 1y are in the maximum light-emission state, the LED unit 1 as a whole can achieve an even tone of color obtained as a mixture of colors of light emitted from the LEDs 1a and 1b.

As is the case where LEDs of two colors are used in combination, in a case where LEDs of three colors are used in combination, the number of LEDs 1a forming the LED group 1x and the number of LEDs 1b forming the LED group 1y may be set in such a way that the values of Vfsum1 and Vfsum2, which are the sum of the operating voltages of the LED group 1x and the sum of the operating voltages of the LED group 1y, respectively, become equal to each other.

Alternatively, the number of LEDs 1a and the number of LEDs 1b may be set in such a way that a color with a desired wavelength can be obtained when both the LED groups 1x and 1y are brought into the maximum light-emission state. For example, in a case where the LEDs 1a and 1b of the LED groups 1x and 1y are red, green, and blue LEDs, and white light is emitted when both the LED groups 1x and 1y are brought into the maximum light-emission state, the number of LEDs 1a and the number of LEDs 1b are set in such a way that the brightness ratio of red, green, and blue is 3:6:1. Incidentally, in a case where the number of LEDs 1a and the number of LEDs 1b are set in such a way that a desired color can be obtained in the maximum light-emission state as described above, a resistor is connected in series to the LEDs forming the LED group having a lower operating voltage, such that the same voltage is applied to the LED groups 1x and 1y.

Suppose that white light is emitted when both the LED groups 1x and 1y are brought into the maximum light-emission state. In this case, some examples of a combination of three colors are: (1) a combination in which a green LED (wavelength: 520 nm) and a red LED (wavelength: 680 nm) are used as the LED 1a, and a blue LED (wavelength: 420 nm) is used as the LED 1b, (2) a blue LED (wavelength: 420 nm) and a green LED (wavelength: 520 nm) are used as the LED 1a, and a red LED (wavelength: 680 nm) is used as the LED 1b, and (3) a blue LED (wavelength: 420 nm) and a red LED (wavelength: 680 nm) are used as the LED 1a, and a green LED (wavelength: 520 nm) is used as the LED 1b. Hereinafter, the examples described above will be explained briefly.

(1) Combination of Green LED and Red LED as the LED Group 1x

A description will be given below of a case in which a green LED 1a and a red LED 1a are combined to form the LED group 1x, and the LED group 1y is composed of a blue LED 1b. As described above, the numbers of LEDs are set in such a way that the brightness ratio of red, green, and blue is 3:6:1. That is, with the assumption that red, green, and blue LEDs are equal in emission brightness, the numbers of red, green, and blue LEDs are set so as to satisfy the ratio of 3:6:1. Incidentally, the assumption that the red, green, and blue LEDs are equal in emission brightness holds true for the other examples which will be described further below.

If the LED group 1y is composed of x blue LEDs 1b, the LED group 1x is composed of 3x red LEDs 1a and 6x green LEDs 1a. Here, assume that the red, green, and blue LEDs are equal in operating voltage. Then, a resistor is connected in series to the LED group 1y that is smaller in number, such that the same operating current is passed through the LEDs 1a and 1b.

Figure 7A:
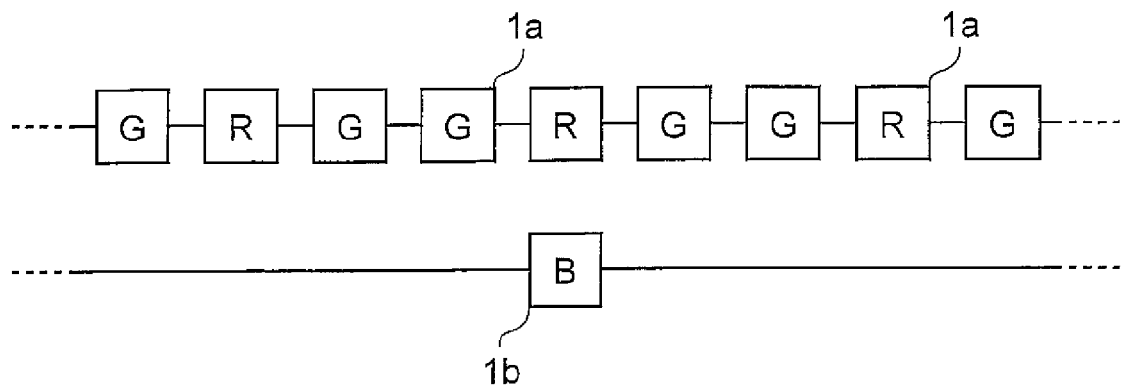
FIG. 7A is a diagram showing an example of an arrangement of LEDs in each of the LED groups forming the LED unit.

In a case where the LED groups 1x and 1y are configured as described above, the red and green LEDs 1a and the blue LED 1b may be arranged, for example, as shown in FIG. 7A, so as to make the LED unit 1 emit light of even color when both the LED groups 1x and 1y are brought into the maximum light-emission state. That is, in the LED group 1x, one red LED 1a (in FIG. 7A, an LED represented by reference character R) is arranged between two green LEDs 1a (in FIG. 7A, an LED represented by reference character G); in the LED group 1y, one blue LED 1b (in FIG. 7A, an LED represented by reference character B) is disposed in a position corresponding to the middle of a group consisting of six green LEDs 1a (G) and three red LEDs 1a (R).

With this arrangement, if the first pulse signal alone is fed to the SSR 2 from the driver circuit 3, the LED group 1x alone is driven by half-wave rectified power. As a result, the LED group 1x alone emits light, whereby yellow light is emitted from the LED unit 1. The brightness of the yellow light is set according to the timing with which the first pulse signal is outputted. If the second pulse signal alone is fed to the SSR 2 from the driver circuit 3, the LED group 1y alone is driven by half-wave rectified power. As a result, the LED group 1y alone emits light, whereby blue light is emitted from the LED unit 1. The brightness of the blue light is set according to the timing with which the second pulse signal is outputted.

If the first and second pulse signals are fed to the SSR 2 from the driver circuit 3, the LED groups 1x and 1y are each driven by half-wave rectified power. As a result, the LED groups 1x and 1y emit light, whereby white light is emitted from the LED unit 1. In this case, if the ON period T1 of the LED group 1x is longer than the ON period T2 of the LED group 1y, white light with a tinge of yellow is emitted from the LED unit 1; if the ON period T1 of the LED group 1x is shorter than the ON period T2 of the LED group 1y, white light with a tinge of blue is emitted from the LED unit 1. According to the timing with which the first pulse signal is outputted and the timing with which the second pulse signal is outputted, the brightness as well as the color tone of the white light emitted from the LED unit 1 is set.

By controlling the amounts of emitted light (brightness) of the LED groups 1x and 1y individually by changing the timing with which the first pulse signal is outputted and the timing with which the second pulse signal is outputted, it is possible to change color in a color range covering yellow, blue, and white. As a result, applications are possible, for example, in illumination which allows the color of light emitted from the LED unit 1 to be changed over time by changing along the time axis the timing with which the first pulse signal is outputted and the timing with which the second pulse signal is outputted. Furthermore, applications are possible in white lights for illumination purposes by making both the LED groups 1x and 1y emit light.

(2) Combination of Blue LED and Green LED as the LED Group 1x

A description will be given below of a case in which a blue LED 1a and a green LED 1a are combined to form the LED group 1x, and the LED group 1y is composed of a red LED 1b. As described above, the numbers of LEDs are set in such a way that the brightness ratio of red, green, and blue is 3:6:1. That is, with the assumption that red, green, and blue LEDs are equal in emission brightness, if the LED group 1y is composed of 3x red LEDs 1b, the LED group 1x is composed of x blue LEDs 1a and 6x green LEDs 1a. Here, assume that the red, green, and blue LEDs are equal in operating voltage. Then, a resistor is connected in series to the LED group 1y, such that the same operating current is passed through the LEDs 1a and 1b.

Figure 7B:
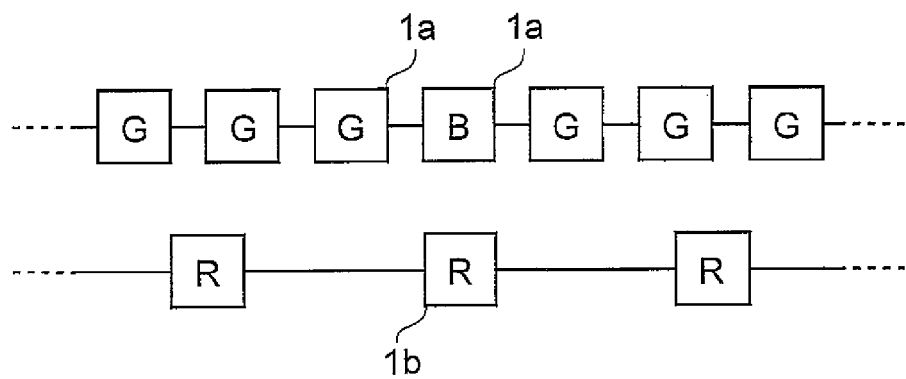
FIG. 7B is a diagram showing an example of another arrangement of LEDs in each of the LED groups forming the LED unit.

In a case where the LED groups 1x and 1y are configured as described above, the blue and green LEDs 1a and the red LEDs 1b may be arranged, for example, as shown in FIG. 7B, so as to make the LED unit 1 emit light of even color when both the LED groups 1x and 1y are brought into the maximum light-emission state. That is, in the LED group 1x, one blue LED 1a (in FIG. 7B, an LED represented by reference character B) is disposed in the middle of six green LEDs 1a (in FIG. 7B, an LED represented by reference character G); in the LED group 1y, three red LEDs 1b (in FIG. 7B, an LED represented by reference character R) are disposed at intervals, in such a way that they divide a group of six green LEDs 1a (G) and one blue LED 1a (B) into almost equal three parts.

With this configuration, if the first pulse signal alone is fed to the SSR 2 from the driver circuit 3, the LED group 1x alone emits light, whereby pale blue light is emitted from the LED unit 1. The brightness of the pale blue light is set according to the timing with which the first pulse signal is outputted. If the second pulse signal alone is fed to the SSR 2 from the driver circuit 3, the LED group 1y alone emits light, whereby red light is emitted from the LED unit 1. The brightness of the red light is set according to the timing with which the second pulse signal is outputted.

If the first and second pulse signals are fed to the SSR 2 from the driver circuit 3, as is the case with the combination described in (1) above, the LED groups 1x and 1y emit light, whereby white light is emitted from the LED unit 1. In this case, if the ON period T1 of the LED group 1x is longer than the ON period T2 of the LED group 1y, white light with a tinge of pale blue is emitted from the LED unit 1; if the ON period T1 of the LED group 1x is shorter than the ON period T2 of the LED group 1y, white light with a tinge of red is emitted from the LED unit 1. According to the timing with which the first pulse signal is outputted and the timing with which the second pulse signal is outputted, the brightness as well as the color tone of the white light emitted from the LED unit 1 is set.

By controlling the amounts of emitted light (brightness) of the LED groups 1x and 1y individually by changing the timing with which the first pulse signal is outputted and the timing with which the second pulse signal is outputted, it is possible to change color in a color range covering pale blue, red, and white. As a result, applications are possible, for example, in illumination which allows the color of light emitted from the LED unit 1 to be changed over time by changing along the time axis the timing with which the first pulse signal is outputted and the timing with which the second pulse signal is outputted. Furthermore, applications are possible in white lights for illumination purposes by making both the LED groups 1x and 1y emit light.

(3) Combination of Red LED and Blue LED as the LED Group 1x

A description will be given below of a case in which a red LED 1a and a blue LED 1a are combined to form the LED group 1x, and the LED group 1y is composed of a green LED 1b. As described above, the numbers of LEDs are set in such a way that the brightness ratio of red, green, and blue is 3:6:1. Here, with the assumption that red, green, and blue LEDs are equal in emission brightness, if the LED group 1y is composed of 6x green LEDs 1b, the LED group 1x is composed of x blue LEDs 1a and 3x red LEDs 1a. Here, assume that the red, green, and blue LEDs are equal in operating voltage. Then, a resistor is connected in series to the LED group 1x, such that the same operating current is passed through the LEDs 1a and 1b.

Figure 7C:
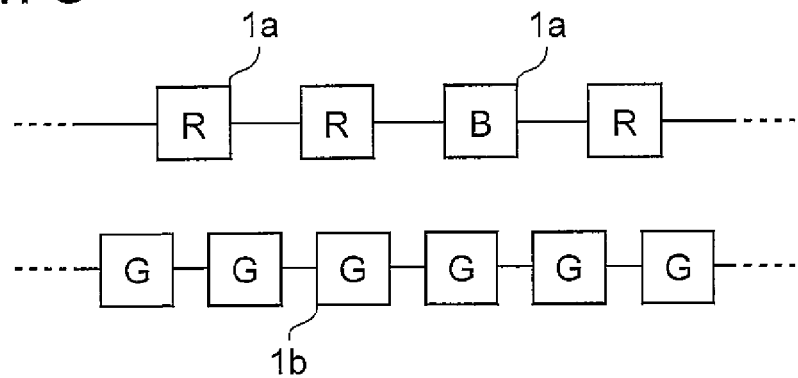
FIG. 7C is a diagram showing an example of still another arrangement of LEDs in each of the LED groups forming the LED unit.

In a case where the LED groups 1x and 1y are configured as described above, the blue and red LEDs 1a and the green LEDs 1b may be arranged, for example, as shown in FIG. 7C, so as to make the LED unit 1 emit light of even color when both the LED groups 1x and 1y are brought into the maximum light-emission state. That is, in the LED group 1x, one red LED 1a (in FIG. 7C, an LED represented by reference character R) and one blue LED 1a (in FIG. 7C, an LED represented by reference character 13) are disposed between two red LEDs 1a, and the three red LEDs 1a (R) and one blue LED 1a (B) are disposed at intervals, in such a way that they divide a group of six green LEDs 1b (in FIG. 7C, an LED represented by reference character G) forming the LED group 1y into almost equal four parts.

With this configuration, if the first pulse signal alone is fed to the SSR 2 from the driver circuit 3, the LED group 1x alone emits light, whereby purple light is emitted from the LED unit 1. The brightness of the purple light is set according to the timing with which the first pulse signal is outputted. If the second pulse signal alone is fed to the SSR 2 from the driver circuit 3, the LED group 1y alone emits light, whereby green light is emitted from the LED unit 1. The brightness of the green light is set according to the timing with which the second pulse signal is outputted.

If the first and second pulse signals are fed to the SSR 2 from the driver circuit 3, as is the case with the combination described in (1) above, the LED groups 1x and 1y emit light, whereby white light is emitted from the LED unit 1. In this case, if the ON period T1 of the LED group 1x is longer than the ON period T2 of the LED group 1y, white light with a tinge of purple is emitted from the LED unit 1; if the ON period T1 of the LED group 1x is shorter than the ON period T2 of the LED group 1y, white light with a tinge of green is emitted from the LED unit 1. According to the timing with which the first pulse signal is outputted and the timing with which the second pulse signal is outputted, the brightness as well as the color tone of the white light emitted from the LED unit 1 is set.

By controlling the amounts of emitted light (brightness) of the LED groups 1x and 1y individually by changing the timing with which the first pulse signal is outputted and the timing with which the second pulse signal is outputted, it is possible to change color in a color range covering purple, green, and white. As a result, applications are possible, for example, in illumination which allows the color of light emitted from the LED unit 1 to be changed over time by changing along the time axis the timing with which the first pulse signal is outputted and the timing with which the second pulse signal is outputted. Furthermore, applications are possible in white lights for illumination purposes by making both the LED groups 1x and 1y emit light.

5. Configuration of the SSR

The above descriptions deal with the configuration of the LED unit 1. Hereinafter, the configuration of the SSR 2 that determines the supply of power to the LED unit 1 from the commercial power source 4 will be described. Some examples of the SSR 2 are an SSR using a light triggered triac and an SSR using a gate-current triggered triac.

Configurations Using Light Triggered Triac

A description will be given below of an SSR 2 using a light triggered triac. In this case, the SSR 2 has, on the primary side thereof, an LED that is driven by a pulse signal from the driver circuit 3, and, on the secondary side thereof, an optically-fired triac that is a bidirectional thyristor operating on light from the LED provided on the primary side. The LED provided on the primary side and the triac provided on the secondary side together form a phototriac coupler. Now, a description will be given below of an example of the configuration of the SSR 2 provided with such a phototriac coupler. The driver circuit 3 produces a pulse signal (corresponding to all the pulse signals including the first and second pulse signals described above) to feed it to the LED of the phototriac coupler, the pulse signal by which the voltage at the anode of the LED becomes higher than the voltage at the cathode thereof thereby bringing the LED into conduction.

(1) Configuration in which Phototriac Coupler Alone is Used

Figure 8A:
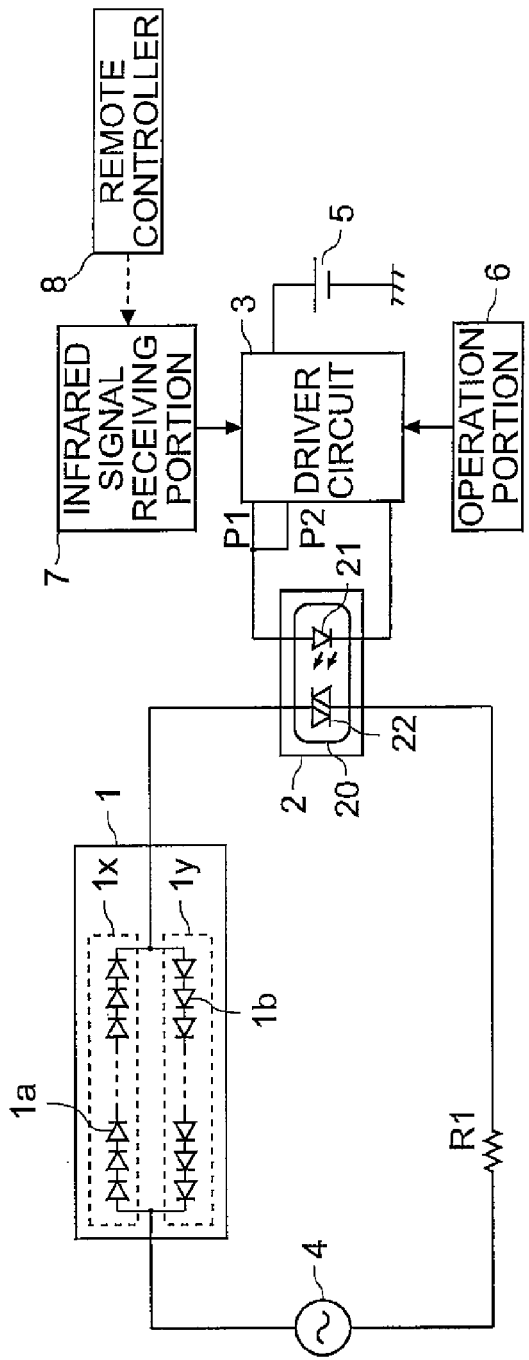
FIG. 8A is a circuit diagram showing an example of a configuration of a light triggered SSR.

If the alternating current supplied from the commercial power source 4 is equal to or smaller than 0.1 A (effective value), the SSR 2 is composed only of a phototriac coupler 20 as shown in FIG. 8A. That is, the SSR 2 includes, on the primary side thereof, an LED 21 emitting light according to a pulse signal from the driver circuit 3, and, on the secondary side thereof, a phototriac 22 that is turned ON/OFF according to the light received from the LED 21.

The phototriac 22 is connected in series between the LED unit 1 and the resistor R1, such that the LED unit 1 is so controlled as to be electrically connected/disconnected. The phototriac 22 here serves as a non zero cross type that is turned ON/OFF in synchronism with the light emission of the LED 21. Incidentally, the alternating-current voltage across the phototriac 22 supplied from the commercial power source 4 needs to be higher than an ON voltage thereof (for example, approximately 1.5 V) to enable the phototriac 22 to operate in synchronism with the light emission of the LED 21.

With this configuration, if the first pulse signal P1 is fed from the driver circuit 3 as shown in the timing charts of FIGS. 2A to 2D, the LED 21 emits light. Upon receipt of the light from the LED 21, the phototriac 22 is brought into a conduction state, marking the beginning of the first conduction period. As a result, if the alternating-current voltage Va from the commercial power source 4 is higher than the operating voltage of the LED group 1x, a current passes through the LED unit 1. Likewise, if the second pulse signal P2 is fed from the driver circuit 3, the LED 21 emits light. Upon receipt of the light from the LED 21, the phototriac 22 is brought into a conduction state, marking the beginning of the second conduction period. As a result, if the alternating-current voltage Va from the commercial power source 4 is higher than the operating voltage of the LED group 1y, a current passes through the LED unit 1.

As described above, in a case where the phototriac 22 serves as a non zero cross type, it can operate quickly in response to the pulse signal, and the lengths of the first and the second conduction periods during which the phototriac 22 is in a conduction state are set according to the timing with which the pulse signal is outputted from the driver circuit 3. In addition, since this configuration allows the load current passing through the phototriac 22 to pass through the LED unit 1, the phototriac 22 limits the load current to be passed through the LED unit 1 as described above. Thus, this configuration is used when the alternating current is equal to or smaller than 0.1 A (effective value).

Figure 8B:
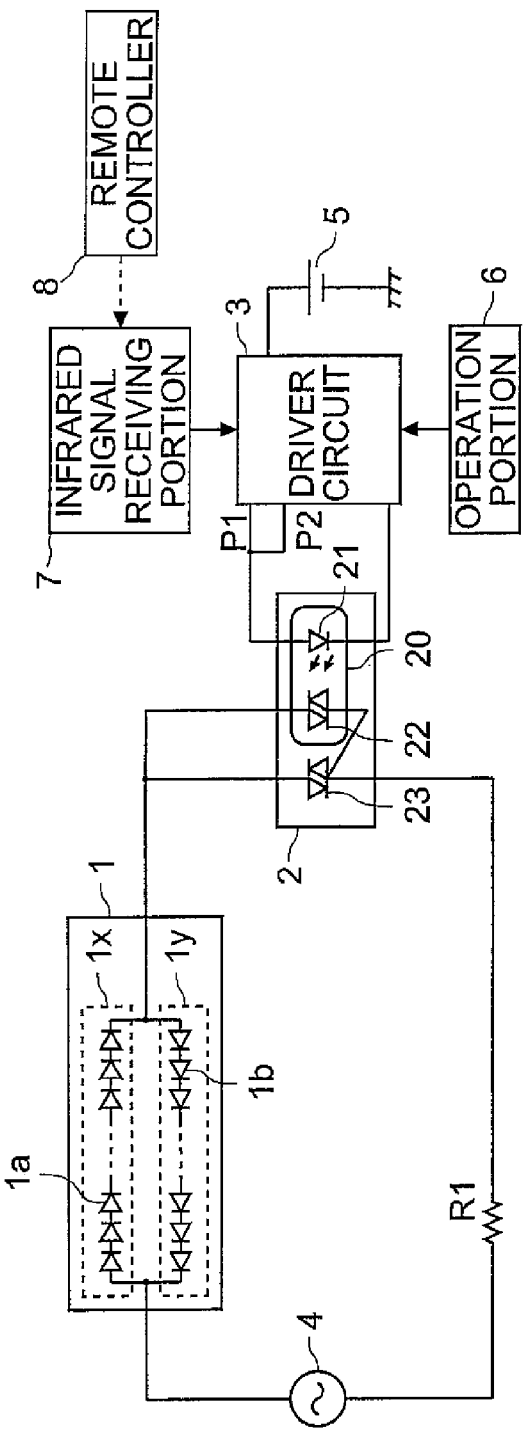
FIG. 8B is a circuit diagram showing an example of another configuration of the light triggered SSR.

(2) Configuration in which Phototriac Coupler and Main Triac are Used in Combination If the alternating current supplied from the commercial power source 4 is greater than 0.1 A (effective value) but equal to or smaller than 8 A (effective value), the SSR 2 further includes on the secondary side thereof a main triac 23 that is turned ON/OFF by the phototriac coupler 20, as shown in FIG. 8B. That is, the main triac 23 is connected in series between the LED unit 1 and the resistor R1. The phototriac 22 of the phototriac coupler 20 is connected between one end of the main triac 23 (in the figure, the end thereof on the side of the LED unit 1) and the gate thereof, such that the LED unit 1 is so controlled as to be electrically connected/disconnected.

With this configuration, if the first pulse signal P1 is fed from the driver circuit 3 as shown in the timing charts of FIGS. 2A to 2D, the LED 21 emits light. Upon receipt of the light from the LED 21, the phototriac 22 is brought into a conduction state. As a result, a current flows into the gate of the main triac 23 via the phototriac 22 in a conduction state. This brings the main triac 23 into a conduction state, marking the beginning of the first conduction period. As a result, if the alternating-current voltage Va from the commercial power source 4 is higher than the operating voltage of the LED group 1x, a current passes through the LED unit 1.

Likewise, if the second pulse signal P2 is fed from the driver circuit 3, the LED 21 emits light. Upon receipt of the light from the LED 21, the phototriac 22 is brought into a conduction state. As a result, a current flows into the gate of the main triac 23 via the phototriac 22 in a conduction state. This brings the main triac 23 into a conduction state, marking the beginning of the second conduction period. As a result, if the alternating-current voltage Va from the commercial power source 4 is higher than the operating voltage of the LED group 1y, a current passes through the LED unit 1.

Also in this configuration, since the phototriac 22 serves as a non zero cross type, it can operate quickly in response to the pulse signal, and the lengths of the first and the second conduction periods during which the phototriac 22 is in a conduction state are set according to the timing with which the pulse signal is outputted from the driver circuit 3. In addition, since this configuration allows the load current passing through the main triac 23 to pass through the LED unit 1, it is possible to pass a greater current than when the configuration that allows the load current to pass through the phototriac 22 is adopted. Thus, as described above, this configuration can be used when the alternating current is greater than 0.1 A (effective value) but equal to or smaller than 8 A (effective value).

(3) Configuration in which Zero Cross Type Phototriac Coupler is Used

Figure 9A:
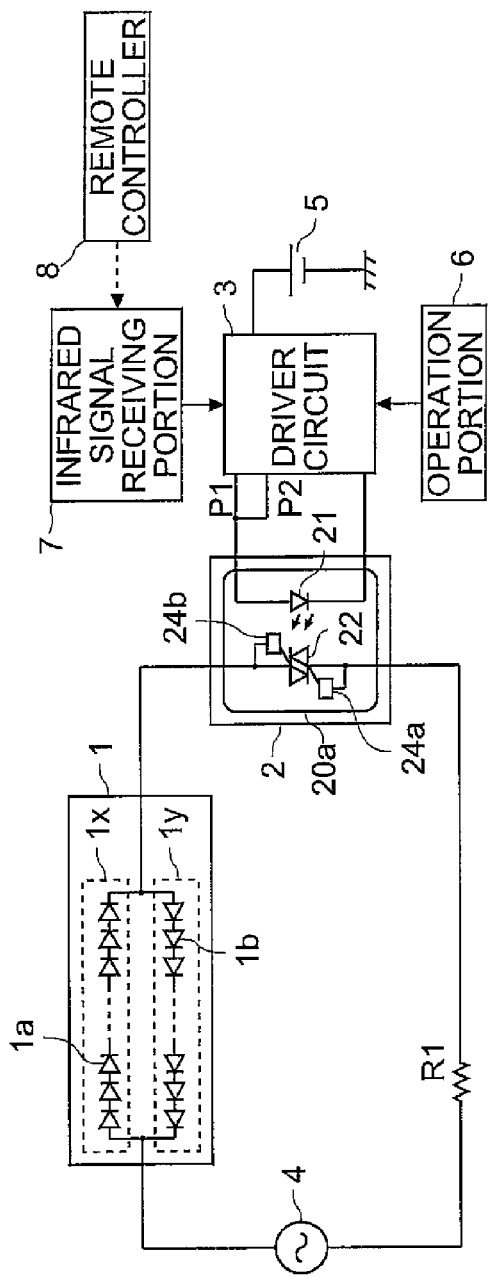
FIG. 9A is a circuit diagram showing an example of still another configuration of the light triggered SSR.
Figure 9B:
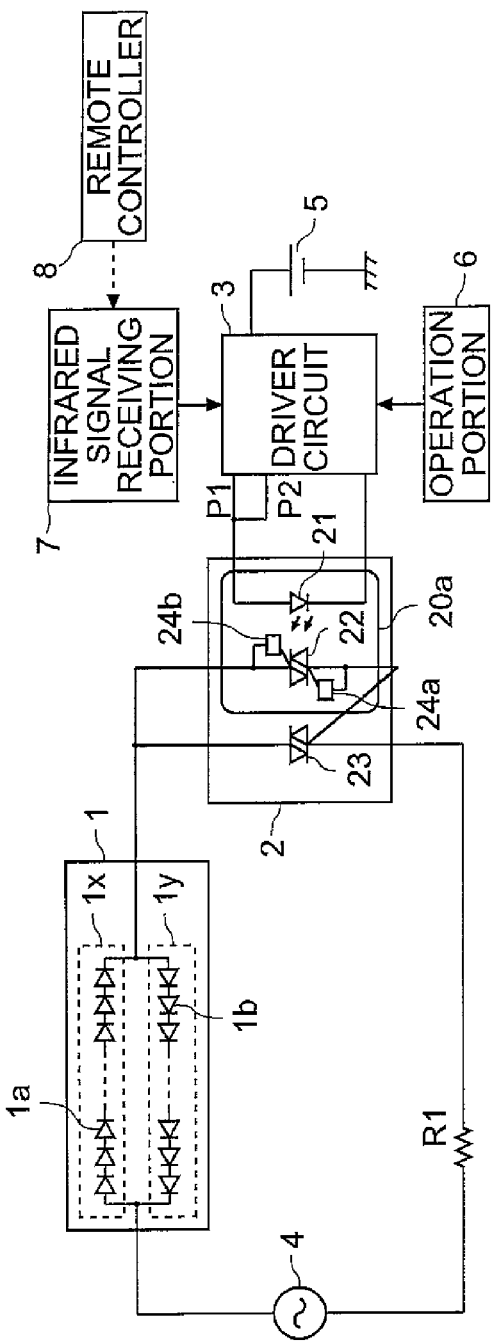
FIG. 9B is a circuit diagram showing an example of still another configuration of the light triggered SSR.

The two configurations described above deal with the non zero cross type phototriac couplers; however, it is also possible to use a zero cross type phototriac coupler. As shown in FIGS. 9A and 9B, used as a phototriac coupler here is a phototriac coupler 20a obtained by adding two zero cross circuits 24a and 24b to the phototriac coupler 20 shown in FIGS. 8A and 8B. In other respects, this configuration is the same as the two configurations described above (the configurations shown in FIGS. 8A and 8B). Incidentally, used as the zero cross circuits 24a and 24b are publicly known or well-known zero cross circuits, and their detailed descriptions will be omitted.

The zero cross circuit 24a is provided between one terminal of the phototriac 22 and a gate thereof, and the zero cross circuit 24b is provided between the other terminal of the phototriac 22 and a gate thereof. Due to the presence of the zero cross circuits 24a and 24b, even when the LED 21 is emitting light, the phototriac 22 is not brought into a conduction state unless the voltage across the phototriac 22 is equal to or lower than a predetermined voltage value.

Unlike the two configurations described above, this configuration needs to produce a pulse signal that makes the LED 21 emit light, until the alternating-current voltage from the commercial power source 4 reaches the zero crossing. In addition, although unlike the non zero cross type this configuration cannot allow the first and second conduction periods to be adjusted in a shorter duration than a half cycle of the alternating-current voltage from the commercial power source 4, it can achieve a stable operation. Using a zero cross type phototriac coupler helps achieve a stable operation, because it offers higher noise immunity and reduces a noise current that will flow when the phototriac coupler performs switching operation.

That is, using a zero cross type phototriac coupler makes it possible to reduce the possibility of a sudden application of the voltage from the commercial power source 4 to the phototriac 22, and the possibility of the phototriac 22 malfunctioning due to voltage noise superimposed on the AC power from the commercial power source 4. Furthermore, even if the phototriac 22 is turned ON when the alternating-current voltage from the commercial power source 4 approaches its maximum or minimum value, it is possible to prevent a large operating current from suddenly flowing. This helps prevent a large operating current from suddenly passing through a load, namely the LED unit 1, and hence prevent degradation or breakdown of the LEDs 1a and 1b provided in the LED unit 1.

Configurations Using Gate-Current Triggered Triac

Figure 10:
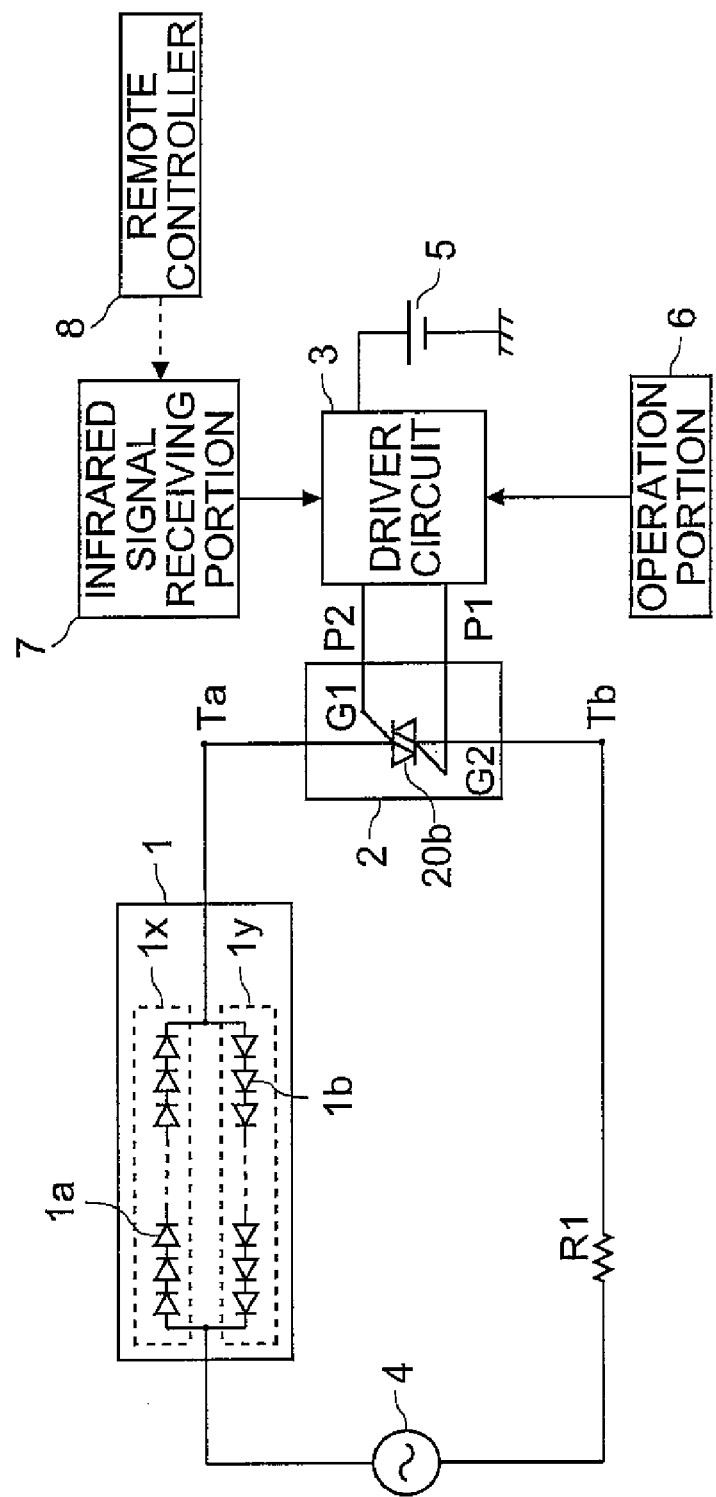
FIG. 10 is a circuit diagram showing an example of a configuration of a gate-current triggered SSR.

In the configuration using the light triggered triac described above, the secondary side of the SSR 2 is turned ON/OFF through an exchange of light between the primary and secondary sides of the SSR 2, and therefore the primary and secondary sides are isolated from each other. However, if the driver circuit 3 feeding a pulse signal to the primary side is supplied with power from the DC power source 5 that obtains power from the commercial power source 4, there is no need to isolate the primary and secondary sides from each other. Thus, as shown in FIG. 10, the SSR 2 can be configured by using a gate-current triggered triac 20b.

The triac 20b is connected in series between the LED unit 1 and the resistor R1, and has two gates G1 and G2 at both ends thereof. That is, the triac 20b has the gate G1 on the side of a terminal Ta at which it is connected to the LED unit 1, and the gate G2 on the side of a terminal Tb at which it is connected to the resistor R1. To the gate G1, the second pulse signal P2 is inputted from the driver circuit 3 to control the second conduction period, whereby the light emission period (the amount of emitted light) of the LED group 1y is controlled. Likewise, to the gate G2, the first pulse signal P1 is inputted from the driver circuit 3 to control the first conduction period, whereby the light emission period (the amount of emitted light) of the LED group 1x is controlled.

As described above, with the configuration in which the SSR 2 is configured by using the gate-current triggered triac 20b, it is possible to perform the light emission operation in the same manner as in the configuration in which the SSR 2 is configured by using the light triggered phototriac 20. In addition, since there is no need to use the LED 21, it is possible to simplify the configuration as compared with the configuration in which the light triggered type triac is used. Incidentally, power of the DC power source 5 is produced from the commercial power source 4 as follows. For example, as shown in FIG. 11A, by providing a bridge circuit 51 that is connected to the commercial power source 4 for rectification and a smoothing circuit 52 that is connected in a stage following the bridge circuit 51, it is possible to supply to the driver circuit 3 a direct-current voltage equivalent to that supplied by the DC power source 5 described above.

Figure 11A:
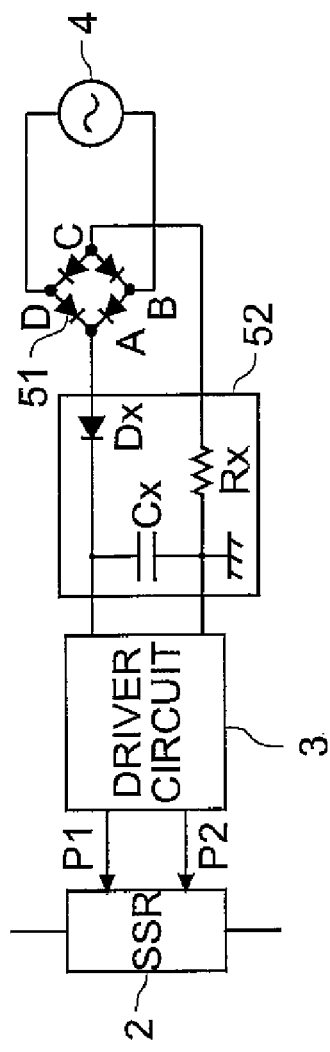
FIG. 11A is a diagram showing a configuration in which an alternating-current power from the commercial power source is converted into a direct-current power and is then supplied instead of directly supplying the direct-current power.

In this case, as shown in FIG. 11A, the smoothing circuit 52 is composed of a diode Dx whose anode is connected to a contact A of the bridge circuit 51, a capacitor Cx connected at one end thereof to the cathode of the diode Dx, the capacitor Cx being connected in parallel with the driver circuit 3, and a resistor Rx provided between the other end of the capacitor Cx and a contact C of the bridge circuit 51, the resistor Rx being connected in series to the driver circuit 3. Incidentally, the commercial power source 4 is connected to a contact B and to a contact D of the bridge circuit 51.

Figure 11B:
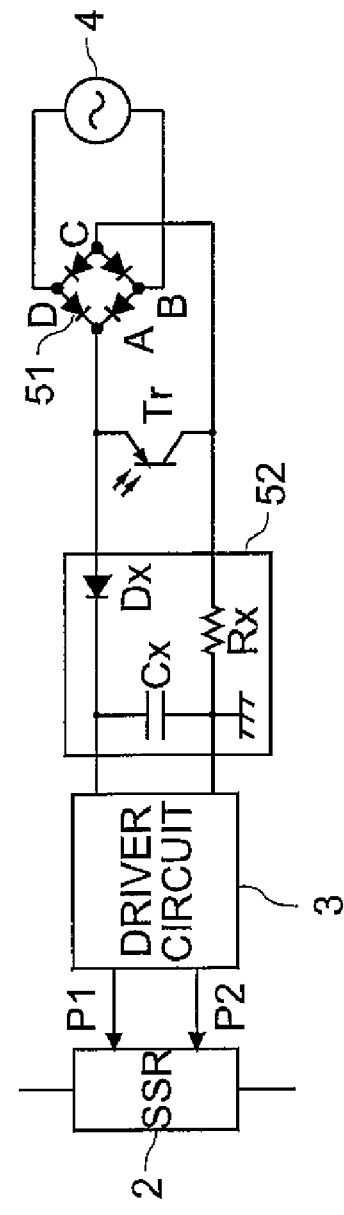
FIG. 11B is a diagram showing another configuration in which an alternating-current power from the commercial power source is converted into a direct-current power and is then supplied instead of directly supplying the direct-current power.

Additionally, for example, as shown in FIG. 11B, a phototransistor Tr connected at the collector thereof to the contact A of the bridge circuit 51 and connected at the emitter thereof to the contact C of the bridge circuit 51 may be provided. With this configuration, if no outside light enters the phototransistor Tr, the phototransistor Tr is turned off. As a result, power is supplied to the driver circuit 3 from the smoothing circuit 52. On the other hand, if outside light enters the phototransistor Tr, the phototransistor Tr is turned on. As a result, no power is supplied to the driver circuit 3 from the smoothing circuit 52.

6. Various Protective Configurations

Figure 12:
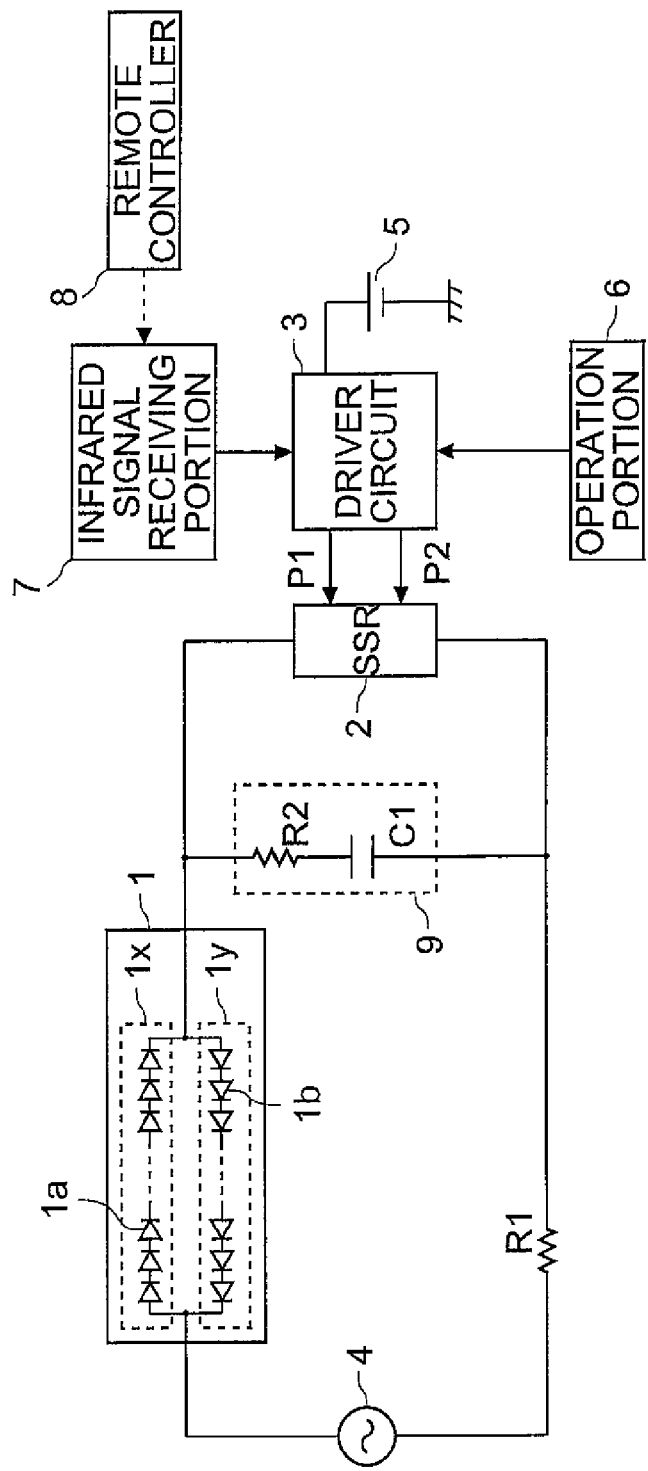
FIG. 12 is a block diagram showing an internal configuration of an LED light-emitting device provided with a snubber circuit.
Figure 13:
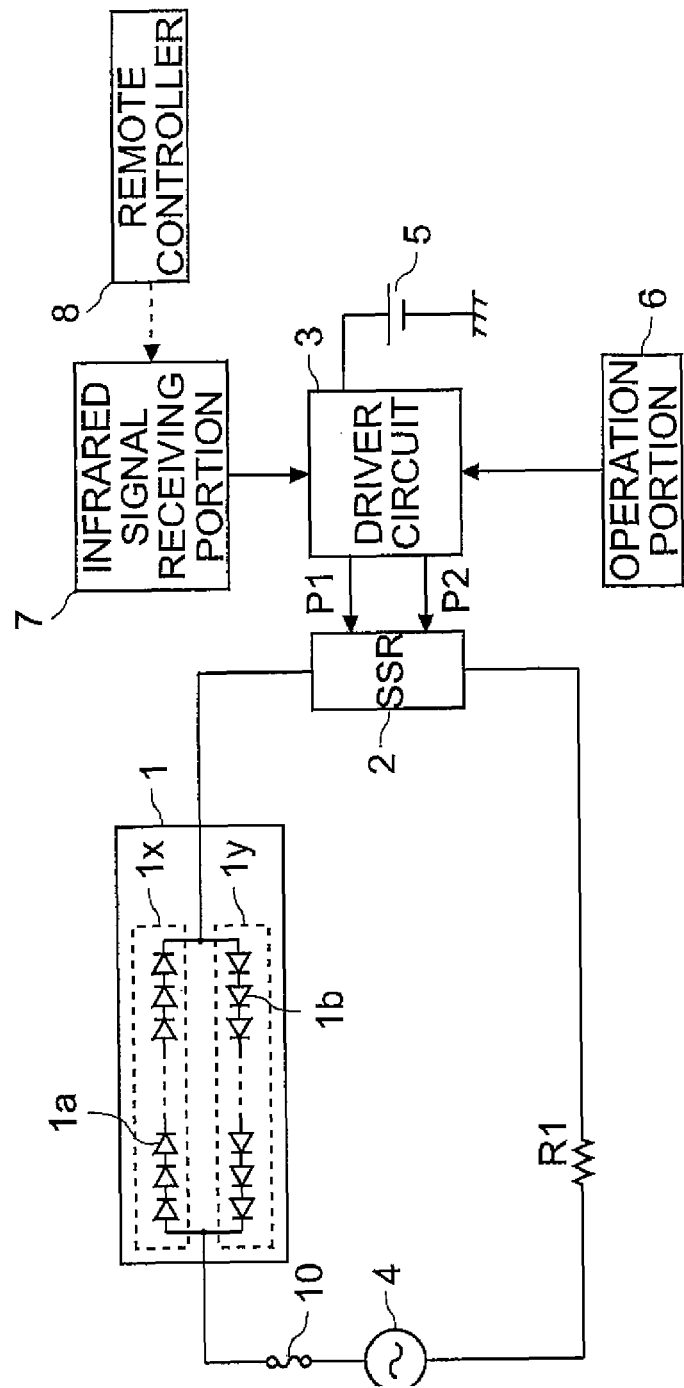
FIG. 13 is a block diagram showing an internal configuration of an LED light-emitting device provided with a fuse.

In the configurations described above, the SSR 2 may be protected in various ways as follows. For example, as shown in FIG. 12, a snubber circuit 9 built as a circuit in which a resistor R2 and a capacitor C1 are connected in series may be connected in parallel with the SSR 2. With this configuration, it is possible to protect the SSR 2 against sudden overvoltage in the commercial power source 4. Alternatively, as shown in FIG. 13, a fuse 10 may be connected in series between the commercial power source 4 and the LED unit 1. With this configuration, it is possible to prevent the LEDs 1a and 1b provided in the LED unit 1 from being damaged as a result of an overcurrent passing through the LED unit 1 due to a sudden voltage surge in the commercial power source 4.

Figure 14:
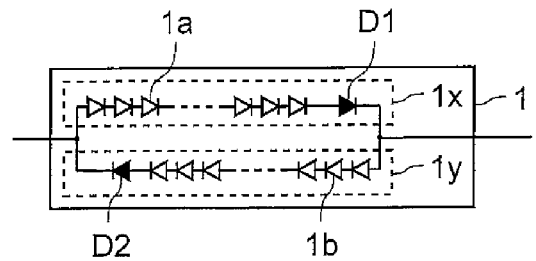
FIG. 14 is a block diagram showing a configuration of an LED unit provided with reverse breakdown voltage compensation.

Instead, as shown in FIG. 14, in the LED unit 1, the LED groups 1x and 1y may be provided with rectifier diodes D1 and D2 connected to the serially-connected LEDs 1a and 1b, respectively, in such a way as to pass a current in the same direction as the LEDs to which they are connected. With this configuration, it is possible to compensate for reverse breakdown voltages of the LED groups 1x and 1y. As a result, even if variation in reverse breakdown voltages of the LEDs 1a and 1b forming the LED groups 1x and 1y, respectively, lowers the reverse breakdown voltage of the LED groups 1x and 1y as a whole, it is possible to prevent a reverse current from passing through the LED groups 1x and 1y, and hence ensure safety.

The protective configurations described above may be appropriately adopted, if necessary, at the design stage. For example, they may be used in combination, or any protective configuration may be omitted if it is unnecessary.

The configurations and operations described above are common to the following embodiments, and therefore their detailed descriptions will not be repeated. In the following description, explanations will be given of operation for controlling the amount of emitted light of the LED unit 1 with emphasis placed on a signal based on which the control is performed, and the control operation performed based on that signal.

First Embodiment

Figure 15:
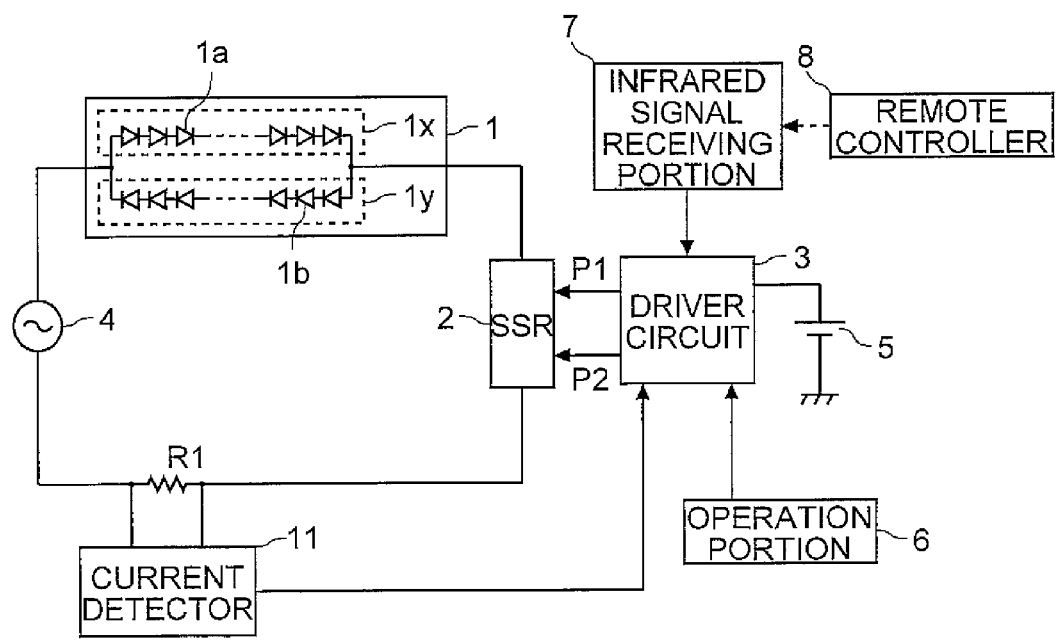
FIG. 15 is a block diagram showing an internal configuration of an LED light-emitting device of a first embodiment.

With reference to the drawings, a first embodiment in which a current passing through the LED unit 1 of the basic configuration described above (FIG. 1) is detected and is then fed back to the driver circuit will be described. FIG. 15 is a block diagram showing a configuration of an LED light-emitting device of this embodiment. In the configuration shown in FIG. 15, such parts and elements as are used for the same purposes as their counterparts in the configuration shown in FIG. 1 are identified with common reference characters, and their detailed descriptions will be omitted.

The configuration of the LED light-emitting device shown in FIG. 15 is obtained by adding to the configuration shown in FIG. 1 a current detector 11 that detects a current value of the load current by detecting the voltage across the resistor R1. The value detected by the current detector 11 is fed to the driver circuit 3. The driver circuit 3 compares a current value specified by the operation portion 6 or the infrared signal receiving portion 7 with the current value detected by the current detector 11, and outputs a pulse signal in such a way as to make the current value detected by the current detector 11 closer to the specified current value.

The current detector 11 detects a peak current passing through the resistor R1, hence the LED unit 1, every half cycle of the AC power from the commercial power source 4, and feeds the detected peak current value to the driver circuit 3. Hereinafter, a direction of the AC voltage supplied from the commercial power source 4 when a current is passed through the LED group 1x is referred to as "one direction"; a direction of the AC voltage supplied from the commercial power source 4 when a current is passed through the LED group 1y is referred to as "the other direction". When a peak current value of the load current in the one direction is fed to the driver circuit 3, the timing with which the first pulse signal is outputted to the SSR 2 is adjusted; when a peak current value of the load current in the other direction is fed to the driver circuit 3, the timing with which the second pulse signal is outputted to the SSR 2 is adjusted.

Figure 16:
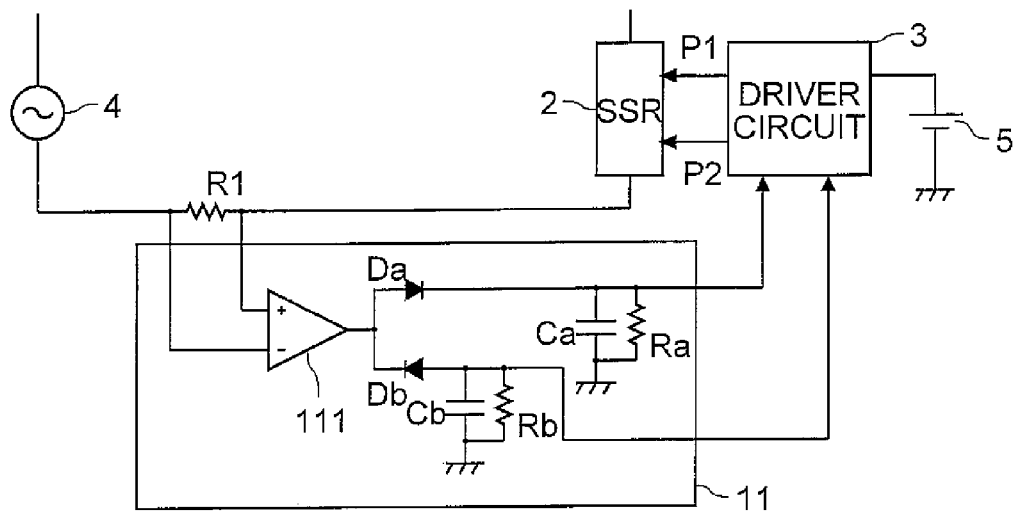
FIG. 16 is a circuit diagram showing a configuration of the current detector in the LED light-emitting device shown in FIG. 15.

In the LED light-emitting device operating as described above, the current detector 11 is configured as shown in FIG. 16. The current detector 11 shown in FIG. 16 includes: a differential amplifier circuit 111 connected at the inverting input terminal to one end of the resistor R1, the one end being located on the side of the commercial power source 4, and connected at the non-inverting input terminal thereof to the other end of the resistor R1; a diode Da connected at the anode thereof to the output terminal of the differential amplifier circuit 111; a diode Db connected at the cathode thereof to the output terminal of the differential amplifier circuit 11; a capacitor Ca and a resistor Ra each being connected at one end thereof to the cathode of the diode Da and grounded at the other end thereof, the capacitor Ca and the resistor Ra thus forming a parallel circuit; and a capacitor Cb and a resistor Rb each being connected at one end thereof to the anode of the diode Db and grounded at the other end thereof, the capacitor Cb and the resistor Rb thus forming a parallel circuit.

Figure 17:
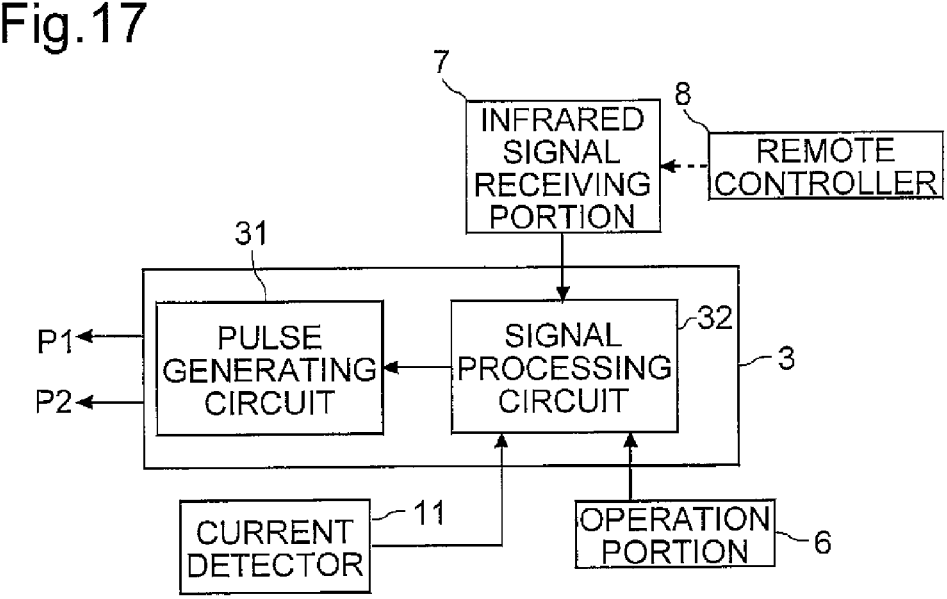
FIG. 17 is a block diagram showing a configuration of the driver circuit in the LED light-emitting device shown in FIG. 15.

As shown in FIG. 17, the driver circuit 3 includes: a pulse generating circuit 31 that generates the first and second pulse signals to be fed to the SSR 2; and a signal processing circuit 32 that sets the timing with which the first pulse signal is outputted from the pulse generating circuit 31 and the timing with which the second pulse signal is outputted therefrom. With this configuration, when the dimming control signal from the operation portion 6 or the infrared signal receiving portion 7 is fed to the signal processing circuit 32, the signal processing circuit 32 sets the timing with which the first pulse signal is outputted and the timing with which the second pulse signal is outputted by analyzing the dimming control signal thus received. Then, the pulse generating circuit 31 outputs to the SSR 2 the first and second pulse signals according to the timing thus set.

As described above, the amount of emitted light (the duration of light emission) of each of the LED groups 1x and 1l of the LED unit 1 is controlled by the driver circuit 3 based on the dimming control signal fed from the outside. That is, the brightness of the LED group 1x is made higher by setting the timing with which the first pulse signal is outputted, in such a way as to make longer the duration of light emission of the LED group 1x; the brightness of the LED group 1x is made lower by setting the timing with which the first pulse signal is outputted, in such a way as to make shorter the duration of light emission of the LED group 1x. The brightness of the LED group 1y is controlled in the same manner by setting the timing with which the second pulse signal is outputted.

The voltage across the resistor R1 is detected with the current detector 11 when the first and second pulse signals are being outputted from the pulse generating circuit 31 according to the dimming control signal fed from the outside, whereby the load current passing through the LED unit 1 is detected. At this point, if the current flows in the one direction from the commercial power source 4, it passes through the LED group 1x. This load current generates a voltage across the resistor R1. When the voltage across the resistor R1 is inputted to the differential amplifier circuit 111, the differential amplifier circuit 111 outputs a positive value, and, as a result of the presence of the diode Da and the capacitor Ca, a voltage corresponding to the peak value of the load current appears at a node at which the capacitor Ca and the resistor Ra are connected together.

As a result of the voltage corresponding to the peak value of the load current, the voltage appearing at the node at which the capacitor Ca and the resistor Ra are connected together, being fed to the driver circuit 3, the signal processing circuit 32 of the driver circuit 3 recognizes the peak value of the load current obtained when a direction of the alternating-current voltage from the commercial power source 4 is the one direction. Upon recognizing the peak value of the load current based on the voltage appearing at the node at which the capacitor Ca and the resistor Ra are connected together, the signal processing circuit 32 obtains an effective value of the load current based on the peak value of the load current. Then, the signal processing circuit 32 compares the obtained effective value of the load current with the effective value of a required load current to determine whether or not the load current passing through the LED group 1x is larger than the required load current.

Likewise, if a direction of the current flowing from the commercial power source 4 is the other direction, the current passes through the LED group 1y, and this load current generates a voltage across the resistor R1. As a result, the differential amplifier circuit 111 outputs a negative value, and, as a result of the presence of the diode Db and the capacitor Cb, a voltage corresponding to the peak value of the load current appears at a node at which the capacitor Cb and the resistor Rb are connected together. Based on the voltage appearing at the node at which the capacitor Cb and the resistor Rb are connected together, the driver circuit 3 recognizes the peak value of the load current, and obtains an effective value of the load current based on the peak value of the load current. Then, the obtained effective value of the load current is compared with the effective value of a required load current to determine whether or not the load current passing through the LED group 1y is larger than the required load current.

In this way, it is determined whether or not the load currents passing through the LED groups 1x and 1y are larger than their respective required load currents. Then, based on the determination results, the timing with which the first pulse signal is outputted from the pulse generating circuit 31 and the timing with which the second pulse signal is outputted therefrom are changed. That is, if the signal processing circuit 32 finds that the load currents of the LED groups 1x and 1y are larger than their respective required load currents based on the detection results of the current detector 11, the timing with which the first pulse signal is outputted and the timing with which the second pulse signal is outputted are changed so as to make the first and second conduction periods shorter. On the other hand, if the signal processing circuit 32 finds that the load currents of the LED groups 1x and 1y are smaller than their respective required load currents based on the detection results of the current detector 1, the timing with which the first pulse signal is outputted and the timing with which the second pulse signal is outputted are changed so as to make the first and second conduction periods longer.

As described above, according to this embodiment, by providing a peak value detection circuit for detecting the peak value of the load current obtained when a direction of the alternating-current voltage of the commercial power source 4 is the one direction and the peak value of the load current obtained when it is the other direction, it is possible to detect the load current passing through the LED unit 1 with a simple configuration. In addition, by feeding the detected value of the load current of the LED unit 1 to the driver circuit 3, it is possible to perform feedback control of the timing with which the pulse signal to be fed to the SSR 2 is outputted, in such a way that the amount of emitted light specified from the outside is achieved.

This embodiment deals with a case in which the load current is detected by detecting the voltage across the resistor R1 provided for ensuring safe operation of the LED unit 1. However, it is also possible to provide, in addition to the resistor R1, an extra resistor connected in series, such that the load current is detected by detecting the voltage across the extra resistor thus provided. In this case, this extra resistor provided for detecting the load current also behaves as part of the resistor R1 provided for ensuring safe operation of the LED unit 1. Incidentally, the effective value of the load current may be obtained by referring to a data table of previously-obtained correlation data between the value of a voltage signal from the current detector and the effective value of the load current.

Second Embodiment

Figure 18:
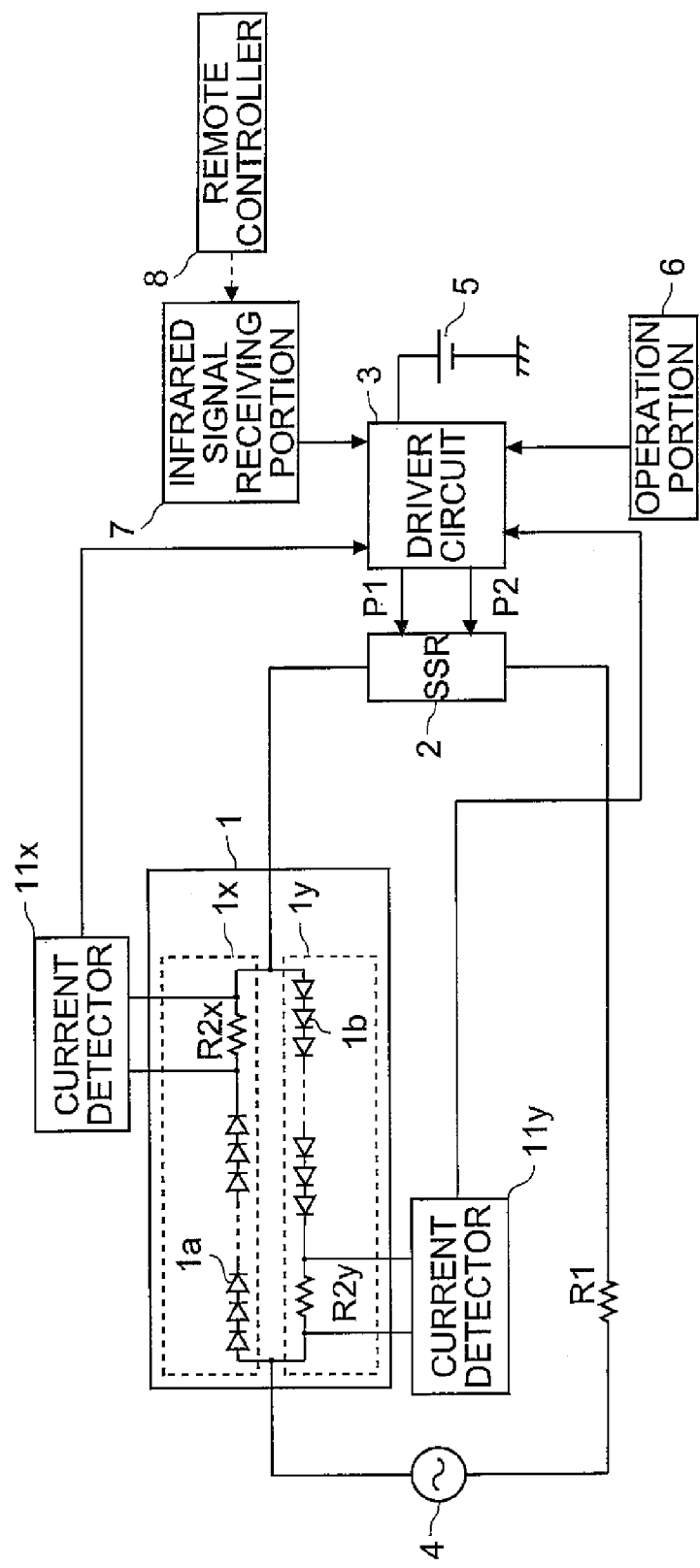
FIG. 18 is a block diagram showing an internal configuration of an LED light-emitting device of a second embodiment.

With reference to the drawings, a second embodiment in which a current passing through the LED unit 1 of the basic configuration described above (FIG. 1) is detected and is then fed back to the driver circuit will be described. FIG. 18 is a block diagram showing a configuration of an LED light-emitting device of this embodiment. In the configuration shown in FIG. 18, such parts and elements as are used for the same purposes as their counterparts in the configuration shown in FIG. 15 are identified with common reference characters, and their detailed descriptions will be omitted.

The LED light-emitting device shown in FIG. 18 is obtained by adding, to the configuration of the LED light-emitting device shown in FIG. 1, resistors R2x and R2y connected in series to the LED groups 1x and 1y, respectively, of the LED unit 1, and current detectors 11x and 11y for detecting the current value of the load current by detecting the voltages across the resistors R2x and R2y, respectively. The values detected by the current detectors 11x and 11y are fed to the driver circuit 3. The resistors R2x and R2y are connected at one end thereof to the cathodes of the LEDs 1a and 1b, respectively, and connected at the other end thereof to the anodes of the LEDs 1b and 1a, respectively.

The current detector 11x detects the load current when a direction of the alternating-current voltage from the commercial power source 4 is the one direction and a current passes through the LED group 1x; the current detector 11y detects the load current when a direction of the alternating-current voltage from the commercial power source 4 is the other direction and a current passes through the LED group 1y. The driver circuit 3 compares a current value specified by the operation portion 6 or the infrared signal receiving portion 7 with the current values detected by the current detectors 11x and 11y, and outputs a pulse signal in such a way as to make the current values detected by the current detectors 11x and 11y closer to the specified current value.

Figure 19:
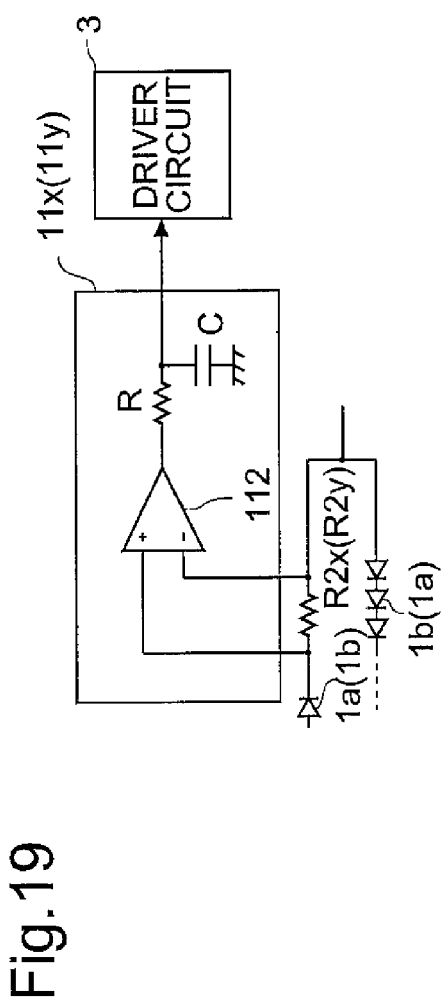
FIG. 19 is a Circuit diagram showing a configuration of the current detector in the LED light-emitting device shown in FIG. 18.

In the LED light-emitting device operating as described above, the current detectors 11x and 11y are each configured as shown in FIG. 19. Since the configuration of the current detector 11x is the same as that of the current detector 11y, only the configuration of the current detector 11x is shown in FIG. 19, and reference characters of the correspondingly functioning blocks in the current detector 11y are given in parentheses. The current detector 11x (11y) shown in FIG. 19 includes a differential amplifier circuit 112 that amplifies the voltage across the resistor R2x (R2y), a resistor R connected at one end thereof to the output terminal of the differential amplifier circuit 112, and a capacitor C connected at one end thereof to the other end of the resistor R and grounded at the other end thereof.

In the current detector 11x(11y), a voltage appearing at a node at which the resistor R and the capacitor C are connected together indicates the magnitude of the load current passing through the LED group 1x (1y). In the differential amplifier circuit 112, the non-inverting input terminal thereof is connected to a node at which one end of the resistor R2x (R2y) and the cathode of the LED 1a (1b) are connected together, and the inverting input terminal thereof is connected to a node at which the other end of the resistor R2x (R2y) and the anode of the LED 1b (1a) are connected together. In the LED light-emitting device provided with the current detectors 11x and 11y as shown in FIG. 19, as is the case with the LED light-emitting device of the first embodiment, the driver circuit 3 is configured as shown in FIG. 17.

In this embodiment, unlike the first embodiment, the current detectors 11x and 11y are provided for the LED groups 1x and 1y, respectively. In other respects, this embodiment is the same as the first embodiment. Also, the operation of this embodiment differs from that of the first embodiment only in that the load current is adjusted by using the detection results obtained by the current detectors 11x and 11y. In other respects, the operation of this embodiment is the same as that of the first embodiment. Therefore, in the following description, only the detection operation of the current detectors 11x and 11y is explained, and the explanations of such operations as are found also in the first embodiment will not be repeated as already given there.

When a direction of the alternating-current voltage from the commercial power source 4 is the one direction and a current passes through the LED group 1x, in the current detector 11x, a voltage appearing across the resistor R2x is amplified by the differential amplifier circuit 112. The output voltage from the differential amplifier circuit 112 is smoothed by the resistor R and the capacitor C, and is then fed to the driver circuit 3. As a result, a voltage signal corresponding to a value obtained by smoothing the current value of the load current passing through the LED group 1x is fed to the driver circuit 3. When a direction of the alternating-current voltage from the commercial power source 4 is the other direction and a current passes through the LED group 1y, in the current detector 11y, a voltage appearing across the resistor R2y is amplified by the differential amplifier circuit 112, and is then smoothed by the resistor R and the capacitor C. As a result, a voltage signal corresponding to a value obtained by smoothing the current value of the load current passing through the LED group 1y is fed to the driver circuit 3.

As a result of the voltage signals from the current detectors 11x and 11y being fed to the driver circuit 3, the signal processing circuit 32 obtains effective values of the load currents passing through the LED groups 1x and 1y. The signal processing circuit 32 then compares each of the obtained effective values of the load currents with the effective value of a required load current, thereby determining whether or not the load currents passing through the LED groups 1x and 1y are larger than their respective required load currents. Based on the determination results thus obtained, it is possible to change the timing with which the first pulse signal is outputted from the pulse generating circuit 31 and the timing with which the second pulse signal is outputted therefrom.

Unlike the first embodiment, this embodiment deals with a configuration in which the current detectors are provided one for each of the LED groups 1x and 1y. As a result, compared with the first embodiment, it is possible to detect the load current with a relatively high degree of accuracy. Also, as is the case with the first embodiment, by feeding the detected value of the load current of the LED unit 1 to the driver circuit 3, it is possible to perform feedback control of the timing with which the pulse signal to be fed to the SSR 2 is outputted, in such a way that the amount of emitted light specified from the outside is achieved.

Third Embodiment

Figure 20:
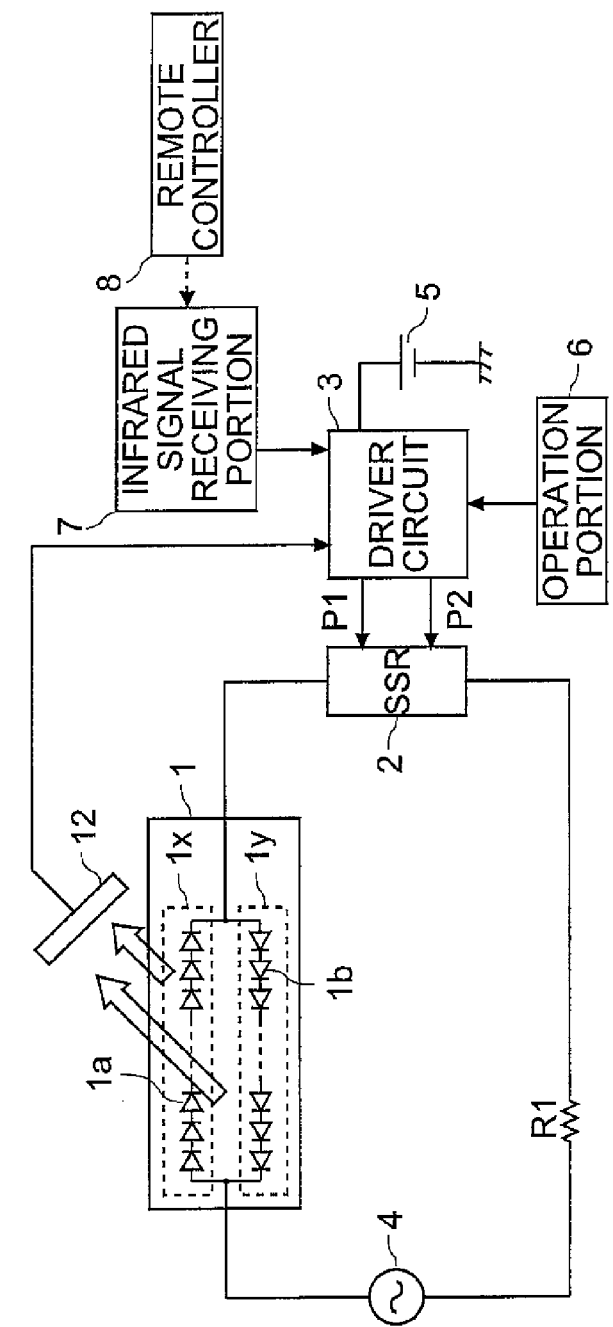
FIG. 20 is a block diagram showing an internal configuration of an LED light-emitting device of a third embodiment.
Figure 21:
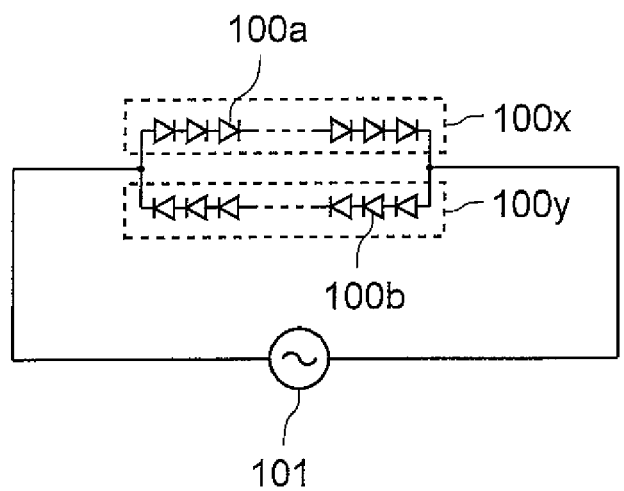
FIG. 21 is a block diagram showing a configuration of a conventional LED light-emitting device driven with an AC power source.
Figure 22:
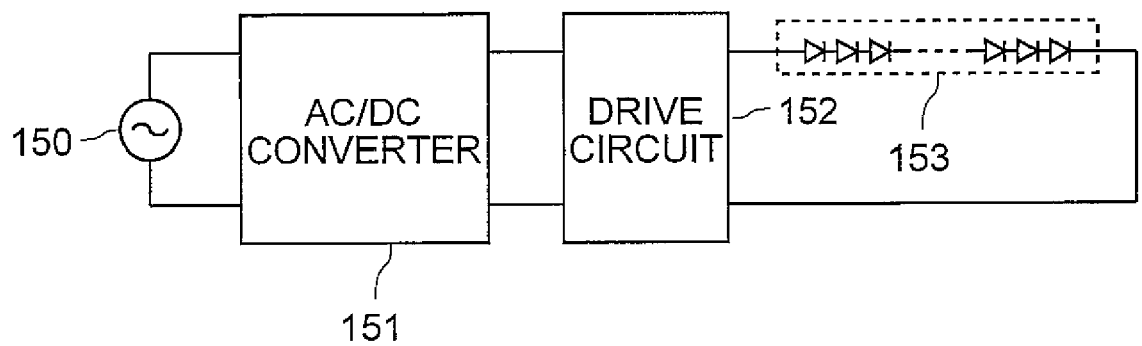
FIG. 22 is a block diagram showing a configuration of a conventional LED light-emitting device driven with a DC power source.

With reference to the drawings, a third embodiment in which a color of light emitted from the LED unit 1 of the basic configuration described above (FIG. 1) is detected and is then fed back to the driver circuit will be described. FIG. 20 is a block diagram showing a configuration of an LED light-emitting device of this embodiment. In the configuration shown in FIG. 20, such parts and elements as are used for the same purposes as their counterparts in the configuration shown in FIG. 1 are identified with common reference characters, and their detailed descriptions will be omitted.

The LED light-emitting device shown in FIG. 20 is obtained by adding, to the configuration of the LED light-emitting device shown in FIG. 1, a color sensor 12 for measuring the color temperature of light emitted from the LED unit 1. A value detected by the color sensor 12 is fed to the driver circuit 3. The driver circuit 3 compares a color according to the color temperature detected by the color sensor 12 with a color specified by the operation portion 6 or the infrared signal receiving portion 7, and outputs a pulse signal in such a way as to make the color according to the color temperature detected by the color sensor 12 closer to the specified color or wavelength. The color sensor 12 is composed of, for example, an RGB filter that separates light into red, green, and blue color components, and light-receiving elements provided one for each of the colors separated by the RGB filter for measuring the brightness values thereof.

In the LED light-emitting device configured as described above, when a direction of the alternating-current voltage from the commercial power source 4 is the one direction, and a current passes through the LED group 1x, a color of light emitted from the LED group 1x is detected by the color sensor 12, and is then fed to the driver circuit 3. In the driver circuit 3, the signal processing circuit 32 compares the color detected by the color sensor 12 with a color of the LED group 1x specified by the dimming control signal from the operation portion 6 or the infrared signal receiving portion 7. That is, the color temperature or wavelength of the color fed from the color sensor 12 is checked, and is then compared with the specified color. Based on the comparison results, the timing with which the first pulse signal is outputted from the pulse generating circuit 31 is set, whereby the amount of emitted light (the duration of light emission) of the LED group 1x is controlled. In this way, feedback control is performed in such a way that light of a specified color is emitted.

Likewise, when a direction of the alternating-current voltage from the commercial power source 4 is the other direction, and a current passes through the LED group 1y, a color of light emitted from the LED group 1y is detected by the color sensor 12 and is then fed to the driver circuit 3. In the signal processing circuit 32, the color detected by the color sensor 12 is compared with a color of the LED group 1y specified by the dimming control signal. Based on the comparison results, the timing with which the second pulse signal is outputted from the pulse generating circuit 31 is set, whereby the amount of emitted light (the duration of light emission) of the LED group 1y is controlled. In this way, feedback control is performed in such a way that light of a specified color is emitted.

As described above, according to this embodiment, by providing the color sensor 12, it is possible to perform feedback control in such a way as to bring the amounts of emitted light of the LED groups 1x and 1y closer to values with which a color having a wavelength specified by the dimming control signal can be obtained. Furthermore, it is possible to realize overcurrent protection by adjusting the brightness or current of the LED unit 1 based on the color temperature or wavelength of a color detected by the color sensor 12.

In this embodiment, in a case where the color sensor 12 is formed integrally with the LED unit 1, colors of the color filters thereof are determined in accordance with the colors of light emitted from the LEDs 1a and 1b forming the LED groups 1x and 1y, respectively. Alternatively, the color sensor 12 may be formed with two sensors separately provided, of which one is for detecting the color temperature or wavelength of the LED group 1x and the other is for detecting the color temperature or wavelength of the LED group 1y. In this case, a color of the color filter of the sensor for detecting the color of light emitted from the LED group 1x is determined in accordance with the color of light emitted from the LEDs 1a forming the LED group 1x, and a color of the color filter of the sensor for detecting the color of light emitted from the LED group 1y is determined in accordance with the color of light emitted from the LEDs 1b forming the LED group 1y.

In the first to third embodiments described above, 90 to 95% of a period during which the LED groups 1x and 1y can be driven with the secondary side of the SSR 2 kept conducting may be initially set as a period during which they are actually driven in the maximum light-emission state. That is, by initially setting 90 to 95% of a period during which the LED groups 1x and 1y can be turned ON as a period during which they are actually turned ON when the maximum light-emission state is specified, the duration of light emission is made shorter than the duration that is set in the design stage. By doing so, if the values of the load currents passing through the LED groups 1x and 1y are decreased after an extended period of use, it is possible to compensate for a reduction in brightness in the maximum light-emission state by making longer the duration of light emission by 5 to 10% of the period during which the LED groups 1x and 1y can be turned ON.

The invention finds applications in lighting devices such as lighting devices that can change the color of light in a color range covering different colors and lighting devices for illumination purposes. Furthermore, depending on a combination of LEDs, the invention can be applied to LED traffic lights, LED lights for preserving freshness of the fresh products placed in the refrigerator, LED lights for improving efficiency of the vegetable cultivation, bactericidal lights, and the like.

What is claimed is:

1. An LED drive circuit, comprising:
a switch circuit having a secondary side connected in series between an LED unit and an alternating-current power source that supplies power to the LED unit to drive the LED unit, the switch circuit controlling an electrical connection between the alternating-current power source and the LED unit; and
a driver circuit controlling timing with which the secondary side of the switch circuit is brought into/out of conduction by feeding a control signal to a primary side of the switch circuit every half wave of alternating-current power from the alternating-current power source,
wherein the LED unit is composed of a first LED group in which a plurality of first LEDs are connected in series in a same forward direction and a second LED group in which a plurality of second LEDs are connected in series in a forward direction that is opposite to the forward direction of the first LEDs, the first LED group and the second LED group being connected in parallel in such a way as to point in different directions,
wherein the driver circuit separately controls durations of light emission of the first and second LED groups by controlling the timing with which the secondary side of the switch circuit is brought into/out of conduction.

2. The LED drive circuit of claim 1, wherein
the first LED group and the second LED group emit light at different wavelengths.

3. The LED drive circuit of claim 2, wherein
at least one of the first and second LED groups is composed of different LEDs that emit light at different wavelengths.

4. The LED drive circuit of claim 3, wherein
the first and second LEDs comprise an LED emitting red light, an LED emitting green light, and an LED emitting blue light.

5. The LED drive circuit of claim 4, wherein
when both the first and second LED groups are made to emit light for a same duration of time, a brightness ratio of red, green, and blue light emitted from the LEDs is 3:6:1.

6. The LED drive circuit of claim 1, further comprising:
a current detector for detecting a load current value passing through the LED unit, and notifying the driver circuit of the load current value thus detected,
wherein the driver circuit controls load current values passing through the first and second LED groups by controlling the timing with which the secondary side of the switch circuit is brought into/out of conduction according to the load current value detected by the current detector.

7. The LED drive circuit of claim 6,
wherein the current detector comprises:
a detecting resistor connected in series to the LED unit and the alternating-current power source;
an amplifier for amplifying a voltage across the detecting resistor;
a first current detecting portion for detecting the load current value on a positive side by performing half-wave rectification on a voltage signal from the amplifier, and notifying the driver circuit of the load current value thus detected; and
a second current detecting portion for detecting the load current value on a negative side by performing half-wave rectification on the voltage signal from the amplifier, and notifying the driver circuit of the load current value thus detected.

8. The LED drive circuit of claim 6,
wherein the current detector comprises:
a first detecting resistor connected in series to the first LED group;
a second detecting resistor connected in series to the second LED group;
a first amplifier for amplifying a voltage across the first detecting resistor;

a second amplifier for amplifying a voltage across the second detecting resistor;

a first current detecting portion for detecting a load current value passing through the first LED group by smoothing a voltage signal from the first amplifier, and notifying the driver circuit of the load current value thus detected; and a second current detecting portion for detecting a load current value passing through the second LED group by smoothing a voltage signal from the second amplifier, and notifying the driver circuit of the load current value thus detected.

9. The LED drive circuit of claim 1, further comprising:

a color sensor for detecting a color of light emitted from the LED unit, and notifying the driver circuit of the color thus detected, wherein the driver circuit separately controls durations of light emission of the first and second LED groups by controlling the timing with which the secondary side of the switch circuit is brought into/out of conduction according to the color detected by the color sensor.

10. The LED drive circuit of claim 1, further comprising:

an adjusting resistor connected in series to the LED unit and the alternating-current power source, the adjusting resistor adjusting an operating voltage of the LED unit.

11. The LED drive circuit of claim 10, wherein the adjusting resistor is a variable resistor.

12. The LED drive circuit of claim 1, wherein the first LED group is provided with a rectifier diode connected in series to the first LEDs in a same forward direction as the first LEDs, wherein the second LED group is provided with a rectifier diode connected in series to the second LEDs in a same forward direction as the second LEDs.

13. The LED drive circuit of claim 1, wherein if there is a difference between a sum of operating voltages of the first LEDs forming the first LED group and a sum of operating voltages of the second LEDs forming the second LED group, a compensating resistor commensurate with the difference is connected in series to the LED group having a smaller sum, so as to compensate for the difference.

14. The LED drive circuit of claim 1, wherein the switch circuit comprises a phototriac coupler built with an LED forming the primary side of the switch circuit and a phototriac forming the secondary side of the switch circuit.

15. The LED drive circuit of claim 1, wherein the switch circuit comprises:

as the primary side thereof, an LED of a phototriac coupler; and as the secondary side thereof, a phototriac of the phototriac coupler and a main triac that is turned ON/OFF with a signal fed to a gate thereof by the phototriac.

16. The LED drive circuit of claim 1, wherein the switch circuit comprises a gate-current triggered triac, wherein the triac forms the secondary side of the switch circuit and a gate of the triac forms the primary side of the switch circuit.

17. An LED light-emitting device, comprising:

an LED unit composed of a first LED group in which a plurality of first LEDs are connected in series in a same forward direction and a second LED group in which a plurality of second LEDs are connected in series in a forward direction that is opposite to the forward direction of the first LEDs, the first LED group and the second LED group being connected in parallel in such a way as to point in different directions;

an alternating-current power source connected in series to the LED unit; and an LED drive circuit controlling the LED unit and the alternating-current power source to be electrically connected/disconnected, wherein the LED drive circuit comprises:

a switch circuit having a secondary side connected in series between the LED unit and the alternating-current power source, the switch circuit controlling an electrical connection between the alternating-current power source and the LED unit; and a driver circuit separately controlling durations of light emission of the first and second LED groups by controlling timing with which the secondary side of the switch circuit is brought into/out of conduction by feeding a control signal to a primary side of the switch circuit every half wave of alternating-current power from the alternating-current power source.

* * * * *